United States Patent
Reed et al.

(10) Patent No.: US 12,231,741 B2
(45) Date of Patent: Feb. 18, 2025

(54) SYSTEMS AND METHODS FOR MONITORING THE DISPLAY OF CONTENT USING EMBEDDED WATERMARKS

(71) Applicant: VIZIO, INC., Irvine, CA (US)

(72) Inventors: Brian Reed, Darien, CT (US);
Kyoungsoo Moon, Dublin, CA (US);
W. Leo Hoarty, Morgan Hill, CA (US)

(73) Assignee: VIZIO, INC., Irvine, CA (US)

( * ) Notice: Subject to any disclaimer, the term of this patent is extended or adjusted under 35 U.S.C. 154(b) by 249 days.

(21) Appl. No.: 17/887,657

(22) Filed: Aug. 15, 2022

(65) Prior Publication Data

US 2023/0055101 A1  Feb. 23, 2023

Related U.S. Application Data

(60) Provisional application No. 63/234,170, filed on Aug. 17, 2021.

(51) Int. Cl.
*H04N 21/8358* (2011.01)
*H04L 9/32* (2006.01)

(52) U.S. Cl.
CPC ....... *H04N 21/8358* (2013.01); *H04L 9/3213* (2013.01); *H04L 2209/608* (2013.01)

(58) Field of Classification Search
CPC ......... H04N 21/44008; H04N 21/4331; H04N 21/4316; H04N 21/44016; H04N 21/8358; H04L 9/3213; H04L 2209/608
See application file for complete search history.

(56) References Cited

U.S. PATENT DOCUMENTS

| | | | |
|---|---|---|---|
| 11,082,710 B2 | 8/2021 | Hoarty et al. | |
| 2003/0050961 A1* | 3/2003 | Rodriguez | G06K 7/1417 707/E17.112 |
| 2006/0120560 A1* | 6/2006 | Davis | H04L 67/5651 707/E17.02 |
| 2007/0250195 A1* | 10/2007 | Rhoads | G06Q 20/1235 700/94 |
| 2014/0282695 A1* | 9/2014 | Bakar | G06Q 30/0241 725/32 |
| 2014/0344033 A1* | 11/2014 | Driscoll | G06V 20/46 705/14.1 |
| 2015/0195597 A1 | 7/2015 | Gordon | |

(Continued)

FOREIGN PATENT DOCUMENTS

WO  2023/022960 A1  2/2023

OTHER PUBLICATIONS

International Search Report and Written Opinion for PCT Application No. PCT/US2022/040291 dated Oct. 31, 2022; 11 pages.

*Primary Examiner* — Mohammad A Siddiqi
(74) *Attorney, Agent, or Firm* — POLSINELLI LLP

(57) ABSTRACT

Systems and method are provided for detecting the display of media and/or specialized content using embedded watermarks. For example, a media device may receive video data including a set of video frames. The media device may detect, in at least one video frame of the set of video frames, a watermark embedded into the at least one video frame. The watermark may be usable to identify media to be displayed by the media device. The media device may display the media. The media device may then transmit an indication that the media has been presented by the media device to a destination device.

15 Claims, 14 Drawing Sheets

(56) References Cited

U.S. PATENT DOCUMENTS

| | | | |
|---|---|---|---|
| 2019/0141414 A1* | 5/2019 | Goodes | H04N 21/25833 |
| 2021/0067842 A1* | 3/2021 | Revital | G06F 21/1063 |
| 2021/0112313 A1* | 4/2021 | Neumeier | H04N 21/8456 |
| 2022/0036495 A1* | 2/2022 | Reed | G06T 1/0028 |
| 2023/0083893 A1* | 3/2023 | Craft | G06Q 30/0224 |
| | | | 707/769 |

* cited by examiner

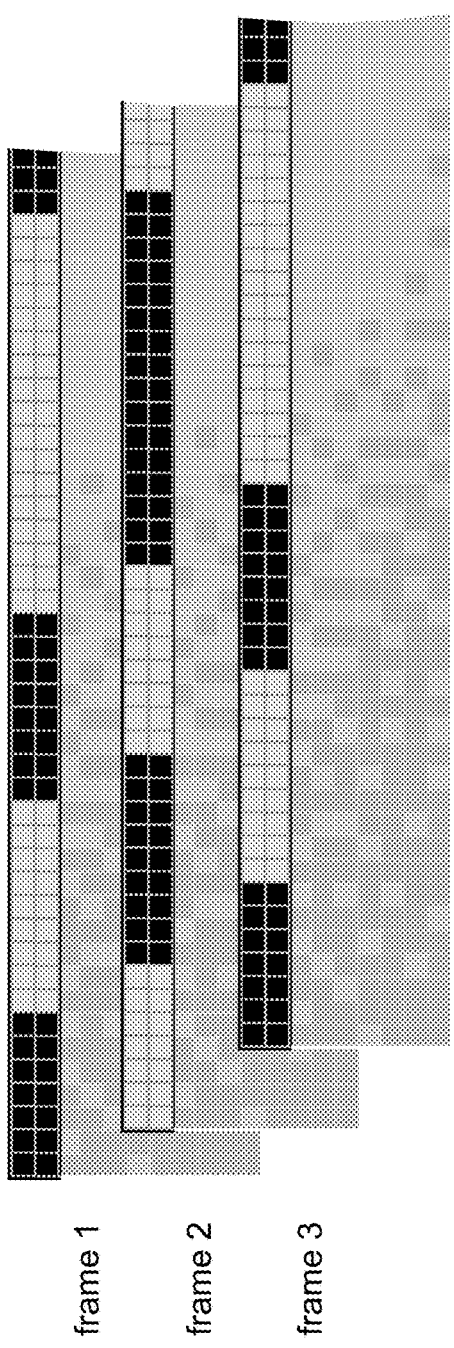
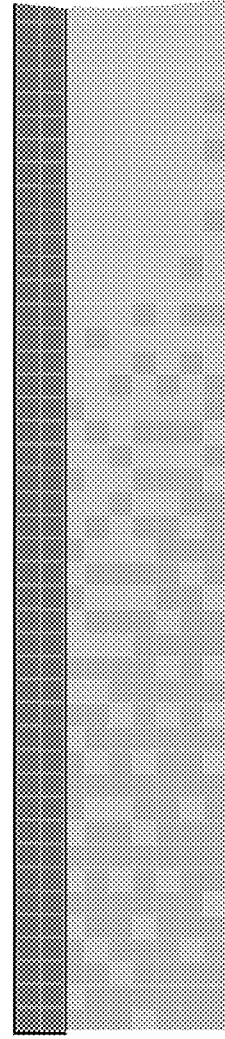
Alternating video frame symbol values tends to cause merging of values as perceived by a TV viewer, reducing the effect of flicker from the embedded data.
FIG. 10A

Enhanced Lead-In Symbols—Extended Number of Pixels per Symbol

(1) At start of each frame, the pixel count is doubled per symbol for the first 'n' symbols.

SYSTEMS AND METHODS FOR MONITORING THE DISPLAY OF CONTENT USING EMBEDDED WATERMARKS

CROSS REFERENCE TO RELATED APPLICATIONS

This application claims the benefit to U.S. Provisional Patent Application No. 63/234,170 filed on Aug. 17, 2021, which is hereby incorporated by reference in its entirety for all purposes.

TECHNICAL FIELD

This disclosure relates generally to monitoring the display of content, and more particularly to detecting data embedded within digital video signals to identify the content being displayed by a media device.

BACKGROUND

Media devices receive multi-channel broadcast video from a media service provider (e.g., a cable, satellite dish, etc.). The broadcast video can include media (e.g., television programs, movies, etc.) with specialized content (e.g., advertisements, informational content, etc.) that subsidizes the resource cost of the media. The quantity of resources provided by the content providers of specialized content is generally based on the quantity of users that viewed the specialized content. For example, content providers may provide a particular quantity of resources for every thousand "impressions" or times that the specialized content is viewed, which can be referred to as "cost per thousand" or "CPM". Because the specialized content is included in the broadcast video, it can be assumed that the specialized content was displayed if the media device was displaying the broadcast video. However, modern media devices may display content from diverse and dynamic sources (e.g., over the Internet, time-shifted sources such as local or remote digital-video recorders, etc.). As a result, detecting the display of the media is no longer indicative of a display of the specialized content.

SUMMARY

Methods and systems are described herein for monitoring the display of content using embedded watermarks. The methods include: receiving, by a media device, video data including a set of video frames; detecting, in at least one video frame of the set of video frames, a watermark embedded into the at least one video frame, wherein the watermark identifies media to be displayed by the media device; displaying the media by the media device; and transmitting, to a destination address based on detecting the watermark, an indication that the media has been presented by the media device.

The systems described herein may monitor the display of content using embedded watermarks. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 10A illustrates an example sequence of video frames in which the values for zero and one symbols of a watermark alternate to cause a perceptual blurring of the watermark to the human eye according to aspects of the present disclosure.

DETAILED DESCRIPTION

Figure 1:
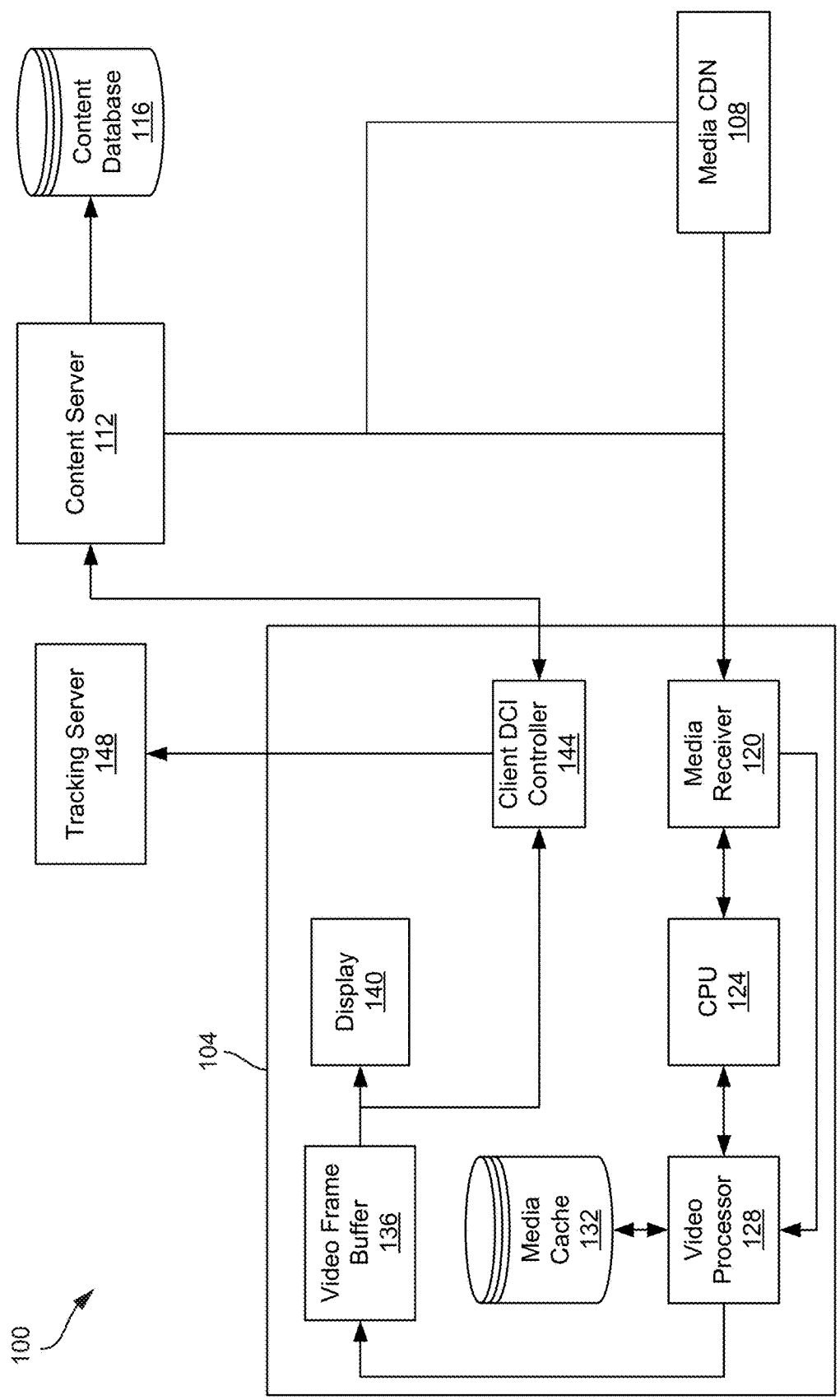
FIG. 1 illustrates an example block diagram of a client-side media insertion system that monitors the display of content at a media device according to aspects of the present disclosure.

The present disclosure includes systems and methods for monitoring the display of content by devices using watermarks. Media devices may be configured to display a variety of types of media from a variety of different sources (e.g., over-the-air (OTA), cable, satellite, Internet, etc.). Some sources may include specialized content (e.g., advertisements, informational content, media content, etc.) that may be displayed during certain intervals of other media. In some instances, the media device may execute a client-side content insertion (CSCI) process to insert specialized content into the other media. For example, a media device may receive video frames corresponding to specialized content separately from video frames of other media (e.g., from separate content delivery networks (CDNs), or the like). The media device may then generate a single sequence of video frames by inserting the video frames of the specialized content into the video frames of the other media. In other instances, a server-side content insertion (SSCI) process may be executed in which a stitching service receives both the specialized content and the other media and generates a single sequence of video frames that can then be transmitted to the media device.

Client devices may request information associated with a display of particular specialized content to improve the specialized content, increase a likelihood that the specialized content will be displayed by media device, compensate a media source (e.g., the stitching service, the CDN, and/or the device and/or service that provided the specialized content to the media device, etc.), or the like. The media device may directly report the display of the specialized content to a tracking server to avoid intermediary devices, such as devices of the stitching service, from misreporting the display of the specialized content. The media device may obtain, from a content server, an address (e.g., such as a uniform resource locator (URL), or the like) that corresponds to a location of a tracking server associated with the specialized content. Using the address, the media device may then transmit a report to the tracking server indicating that the specialized content was displayed.

In some instances, the content server may embed a watermark into one or more video frames of the specialized content. The watermark may provide information and/or instructions to the media device (e.g., such as the address of the content server, an identification of the specialized content, an identification of one or more video frames that are to replace the watermarked video frames, tokens, and/or the like). In some examples, in response to detecting the watermark, the media device can send a report to the tracking server indicating that the specialized content was displayed. The watermark may be embedded into the specialized content in a manner that may be imperceptible (or otherwise not decodable) by intermediate devices (e.g., the stitching service, etc.) to prevent intermediate devices from intercepting information and/or instructions embedded into the watermark.

The watermark may also be imperceptible to users of the media device to prevent the watermark from affecting the quality of the video frames being presented by the media device. In some examples, the watermark may be encoded into pixel data for a video by modifying the luminance and/or chrominance of pixels in the top one or more rows of the video frame. In some instances, the top one or more rows of pixels may not be displayed by the media device. In other instances, the degree in which the luminance and/or chrominance may be selected so as to minimize a likelihood that a user will detect the modification. Shifting the luminance and/or chrominance (e.g., rather than using contrasting pixel values like pure white or pure black) may detectable by the media device but may not be perceptible to users of the media device. The modulated and non-modulated pixels may convey a sequence of symbols (e.g., such as 1's and 0's, or the like) that may represent information and/or instructions.

In some instances, the sequence of symbols may be encrypted (e.g., using an asynchronous or synchronous encryption scheme) before being embedded into the one or more video frames to further reduce a likelihood that another device may intercept the one or more video frames and decode sequence of symbols of the watermark. The generating, embedding, and decoding of watermarks into video frames may be further described in U.S. application Ser. No. 17/389,147 entitled: "System And Methods for the Application of Adaptive Video Watermarks", filed Jul. 29, 2021, which is hereby incorporated by reference in its entirety and for all purposes.

A tracking server may aggregate the information received from one or more media devices to provide reports to the content server and/or client devices associated with the specialized content. Examples of information that may be included within a report may include, but is not limited to, an identification of media and/or specialized content that was displayed by the media device, an amount of time the media and/or specialized content was displayed in seconds or as a percentage of a total amount of time in which the media and/or specialized content could be displayed, demographic information associated with the media device and/or users thereof, an identification of media and/or specialized content that was previously displayed by the media device, network information of the media device (e.g., Internet Protocol (IP) address, media access control (MAC) address, internet service provider (ISP), etc.), an identification of the media device (e.g., a serial number or unique identifier of the media device, mobile advertising ID (MAID), a device type of the media device (e.g., mobile device, computing device, television, smart television, etc.), an identification of a manufacturer of the media device, an identification of specifications of the media device (e.g., hardware and/or software, etc.), combinations thereof, or the like), combinations thereof, or the like.

In some examples, the content server and/or client devices may query the tracking server for a quantity of instances in which particular specialized content was displayed by a particular media device, a particular set of media devices (e.g., identified by serial numbers, IP address, MAC address, geographical location, demographic information of the media devices and/or the users thereof, any combinations thereof, or the like), or by any media device. In some examples, the content server and/or client devices may query the tracking server for information associated with devices that displayed the specialized content, such as demographic information, location information, or the like. Information obtained from the tracking server may be used to improve the specialized content, increase a likelihood that the specialized content will be displayed by media device, to compensate a media source, etc. For example, the content server, and/or client devices may modify the specialized content and/or watermarks embedded therein to increase a likelihood that the media device may display the entire duration of the modified specialized content. The modified specialized content may be stored in the content server and distributed to CDNs upon request by the CDN and/or the media devices.

FIG. 1 illustrates an example block diagram of a client-side media insertion system that monitors the display of content at a media device according to aspects of the present disclosure. Client-side media insertion system 100 inserts media and/or specialized content into a media steam at media device 104. Media device 104 may be configured to receive and display media (e.g., images, video, audio, video and audio, etc.) from a variety of sources (e.g., cable service providers, content delivery networks, Internet service providers, content servers, databases, streaming devices, storage devices, etc.). In some instances, media device 104 may receive media from two or more sources configured to be displayed as a single sequence. In those instances, media device 104 may include process hardware that inserts the video frames from one source into the video frames of another source to generate a single sequence of video frames that can be displayed by media device 104.

Media device 104 may receive media from media content delivery network (CDN) 108 and/or from content server 112. Media CDN 108 may include one or more devices that store media. Media CDN 108 may be operated by, or receive media from, a media service provider (e.g., cable service provider, Internet service provider, etc.) and/or content server 112. Media CDN 108 may include one or more CDNs that logically segment types of media served by media CDN 108. For instance, media CDN 108 may include a first CDN that stores and distributes media streams and a second CDN that stores and distributes specialized content. The second CDN may store specialized content received from other devices such as, but not limited to content server 112. Media CDN 108 may have other CDNs such as, but not limited to, a CDN for a streaming service, a CDN for a cable service provider, a CDN for movies, a CDN for television shows, etc.). Each CDN may store and distribute media and/or specialized content from a same source (e.g., such a same cable service provider, company, network, or the like) or from multiple sources. Media CDN 108 may receive a request for one or more media streams from media device 104 or from a service provider (e.g., a cable service provider, Internet service provider, etc.) to media device 104. In response, media CDN 108 may transmit the requested one or more media streams to the media device 104.

Content server 112 may include one or more devices (e.g., computing devices, servers, etc.) that provide specialized content (e.g., commercials, advertisements, media content, informational content, etc.) to media devices. Content server 112 receive requests for specialized content or particular specialized content from media device 104 and/or media CDN 108. In response, content server 112 may identify a particular specialized content that will satisfy the request. The identified specialized content may be stored by a device of the one or more devices of content server 112 or within a database in communication with content server 112. For example, content server 112 may first determine if the identified specialized content is stored locally and, if so, transmit the identified specialized content to the media device 104 or media CDN 108. If the identified specialized content is not stored locally, content server 112 may query content database 116 for the identified specialized content. Content server 112 may then retrieve the identified specialized content from content database 116 and transmit the identified specialized content to the media device 104 or media CDN 108.

Content server 112 may store and/or generate a watermark that includes additional information and/or instructions. Content server 112 may embed the watermark within the identified specialized content before transmitting the identified specialized content to the media device 104 or media CDN 108. The watermark may be included in metadata of the identified specialized content or embedded into the video frames of the identified specialized content. For instance, content server 112 may set the pixel values of a portion of the one or more video frames (e.g., the top n rows, side n columns, bottom n rows, etc.) to a first pixel value to represent a first symbol (e.g., 0, or the like) and a second pixel value to represent a second symbol (e.g., 0, or the like). Alternatively, to reduce the perceptibility of the portion of the one or more video frames, content server 112 may modulate the pixel values by shifting the luminance and/or chrominance values of the pixels. By shifting the luminance and/or chrominance, the modulated pixels may appear closer in pixel value to the non-modulated pixels, which may prevent a user from perceiving the watermark embedded into the video frame.

The additional information and/or instructions can include information associated with the specialized content (e.g., identifying a quantity of video frame or length of time in which the specialized content is to be displayed, a source of the specialized content, an object presented within the specialized content, information associated with the production of the specialized content, identification of other specialized content that is associated with this specialized content, identification another specialized content that is to replace this specialized content, etc.). In some instances, the instructions may include an identification of one or more processes that are to execute in response to detecting the watermark. For example, the one or more processes can include replacing the specialized content with another specialized content (e.g., received by content server 112, another server, cache of media device 104, or the like). In other instances, the instructions may include executable code that may be executed by media device 104 to perform the one or more processes.

Media receiver 120 may be operated by central processing unit 124 to route some or all of the received media stream, and to video processor 128. For example, the media stream may include one or more sub-streams. Media receiver 120 may identify a particular media sub-stream that is to be displayed by media device 104, isolate the particular media sub-stream and pass the particular sub-stream to video processor. The one or more sub-streams may be encoded into the media stream using any encoding scheme. For instance, the one or more sub-streams (e.g., television channels, etc.) may be encoded into the media stream using a frequency-based encoding scheme. Media receiver 120 may identify a sub-stream based on a frequency in which the sub-stream is encoded into the media stream.

Video processor 128 may process the received video frames (e.g., by upscaling resolution, motion interpolation, smoothing, motion blurring, imaging processing individual video frames, and/or the like) and generate a sequence of video frames for display by media device 104 in real-time. For example, video processor 128 may receive video frames that correspond the specialized content and the video frames that correspond to the media from media CDN 108. Video processor 128 may then insert the video frames that correspond to the specialized content into the video frames that correspond to the media to generate a single sequence of video frames. Video processor 128 may insert other video frames into the video frames that correspond to the media (or into the video frames of the single sequence of video frames). For instance, media device 104 may store other media and/or other specialized content in media cache 132. Video processor 128 may use video frames that correspond to the other media and/or other specialize content from media cache 132 in addition the video frames of the specialized content to generate the single sequence of video frames. Alternatively, or additionally, media device 104 may request video frames that correspond to the other media and/or other specialize content from a remote device (e.g., from content server 112, media CDN 108, and/or other devices). Media device may store the video frames that correspond to the other media and/or other specialize content in media cache 132.

In some instances, the specialized content may include instructions for identifying other specialized content to be inserted into the video frames that correspond to the media. For example, the specialized content may include a watermark that can be decoded by media device 104. The watermark may identify particular specialized content that is to be inserted into the video frames that that correspond to the media. Media device 104 may locate the particular specialized content or a portion thereof (e.g., a first portion of the particular specialized media, or the like) in media cache 132 and/or request the particular specialized content (or the remaining portion of the particular specialized content) from content server 112 and/or another server. In other instances, the instructions may be included with the media (e.g., as metadata and/or a watermark). If the instructions are included in a watermark, media device 104 may decode the watermark to identify the particular specialized content. Video processor 128 may then replace the video frame that include the watermark with the video frames that correspond to the particular specialized content. If the instructions are included in metadata, media device 104 may identify the particular specialized content and the location within the media to insert the video frames of the particular specialized content.

Media cache 132 may store video frames corresponding to media and/or specialized content, metadata associated with the media and/or specialized content, a record of media and/or specialized content displayed by media device 104. Media cache 132 may store video frames of media and/or specialized content to reduce delays in generating the single sequence of video frames and/or delays in displaying video frames by media device 104. For example, in some instances, processing time and/or latency when generating the single sequence of video frames may cause a delay in the display of media and/or specialized content. Processing delays may occur due to processor errors, due to media and/or specialized content not being timely received, and/or when processing load causes the generation of the single sequence of video frames to take longer than expected. The delay may cause video frame buffer 136 to run out of video frames to send to display 140 and display 140 to having nothing to display.

The delay may be reduced or eliminated by storing some or all of the video frames corresponding to the media and/or specialized content in media cache 132. Media device 104 may request some or all of video frames corresponding to media and/or specialized content that is to be displayed in the future. When the media and/or specialized content is due to be displayed, video processor 128 may use the video frames in media cache 132 to generate the single sequence of video frames. If the media cache 132 does not include all of the video frames that correspond to particular media or specialized content, then media device 104 may request the missing video frames while preparing the portion of the media and/or specialized content that is stored in media cache 132 for display. Video processor 128 may insert the remaining video frames into the single sequence of video frames as those video frames are received by media receiver 120. Since a portion of the media and/or specialized content may already be inserted into the single sequence of video frames, display of those frames may commence while the remaining video frames are being received thereby eliminating delays in the display of the media and/or specialized content.

Video processor 128 streams the single sequence of video frames to video frame buffer 136. Video frame buffer 136 may be a buffer that stores video frames as the video frames are received from video processor 128 before being displayed by display 140. Video frame buffer 136 receives the video frames of the sequence of video frames and stores a predetermined quantity of video frames before transmitting the video frames (in order) to display 140. Video frame buffer 136 may regulate a rate in which video frames are displayed by display 140 by transmitting video frames to display 140 in regular intervals. For example, during some time intervals, video processor 128 may generate and transmit video frames at a higher rate than the rate in which video frame buffer is transmitting video frames to display 140. During other time intervals, video processor 128 may generate and transmit video frames at a lower rate than the rate in which video frame buffer is transmitting video frames to display 140. Video frame buffer 136 may regulate the rate in which video frames are transmitted to display 140 by storing the extra video frames received from video processor 128 when video processor 128 is transmitting at the higher rate. When video processor 128 transmits video frames at the lower rate, video frame buffer may continue transmitting video frames using the stored video frames.

Display 140 may be any electronic display (e.g., cathode-ray-tube (CRT), plasma, liquid-crystal display (LCD), light-emitting diode (LED), organic LED (OLED), etc.). In some instances, display 140 may be separate from media device 104. In those instances, media device 104 may include the processing components for generating the single sequence of video frames for display. Media device 104 may then transmit the single sequence of video frames to an external display 140 (e.g., via a wired or wireless interface).

Client dynamic content insertion (DCI) controller 144 may receive an identification of video frames being displayed by display 140 from video frame buffer 136. In some instances, client DCI controller 144 may be or include a client dynamic advertisement insertion (DAI) controller. When particular media and/or specialized content is displayed by display 140, client DCI controller 144 may transmit a communication to tracking server 148 that indicates that the particular media and/or specialized content is being displayed (or was displayed) by display 140. Client DCI controller 144 receive an identification of the particular media and/or specialized content that is to be reported to tracking server 148 upon display from a remote device and/or from the particular media and/or specialized content itself. For example, the particular media and/or specialized content may include a watermark or metadata that includes instructions to communicate the display of the particular media and/or specialized content to tracking server 148. The watermark or metadata may also include an identification of a location (e.g., an address or the like) of tracking server 148. Alternatively, or additionally, media device 104 may request an identification of media and/or specialized content that is to be reported upon display and/or a location of tracking server 148 from a remote device (e.g., such as content server 112, or the like).

Client DCI controller 144 may include information associated with media device 104 and/or users of media device 104 in the communication to tracking server 148. For example, client DCI controller 144 may include demographic information (e.g., a geographic location of media device 104, an age of users of media device 104, a gender of users of media device 104, and/or the like), network information of media device 104 (e.g., an IP address, a MAC address, an internet service provider (ISP), and/or the like), an identification of the duration of time in which the media and/or specialized content was displayed (e.g., in seconds, minutes, as a percentage of a total duration of time the media and/or specialized content would be displayed in not interrupted, etc.), an identification of previously displayed media or specialized content, and/or the like.

Figure 2:
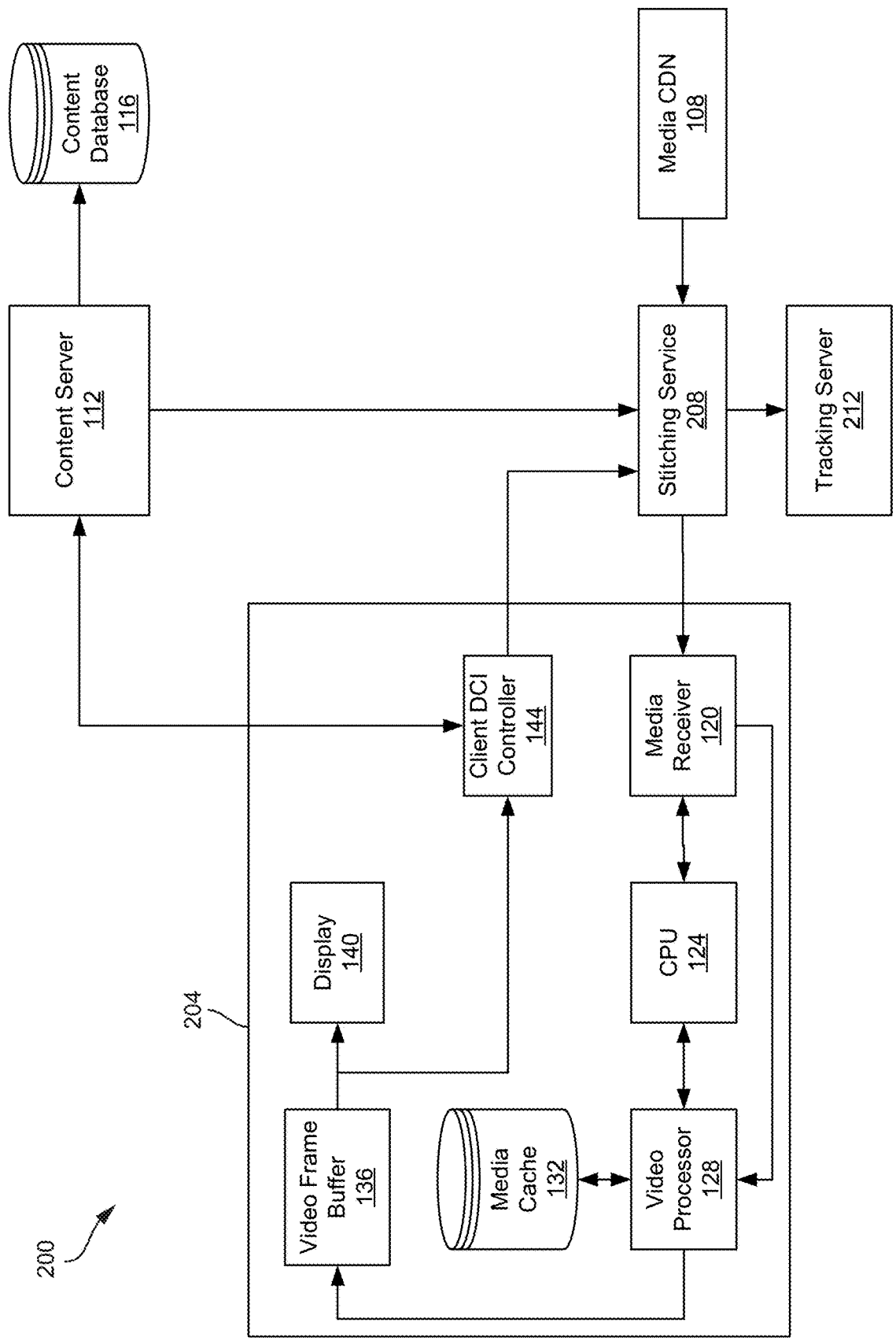
FIG. 2 illustrates an example block diagram of a server-side media insertion system that monitors the display of content at a media device according to aspects of the present disclosure.

FIG. 2 illustrates an example block diagram of a server-side media insertion system that monitors the display of content at a media device according to aspects of the present disclosure. Server-side media insertion system 200 inserts media and/or specialized content into a media steam that is be displayed by media device 204 prior to transmitting the media stream to media device 204. Media device 204 may include the same components as media device 104 of FIG. 1 (as shown), similar components as media device 104, or different components from media device 104. Media device 204 may requests a media stream for display by display 140 of media device 204. Media CDN 108 may receive the request and transmit the requested media stream to stitching service 208.

Media device 204 may also request specialized content for display during the media stream from content server 112. Media device 304 may include an identification of particular specialized content, an identification of a specialized content type, a general request for any specialized content, an identification of media device 204, an identification of information associated with media device 204 (e.g., network information, demographic information, user information, etc.), and/or the like. Content server 112 may select specialized content from content database 116 that satisfies the request and transmit the specialized content to stitching service 208. For example, the specialized content may be selected based on information associated with media device 204 (e.g., such as demographic information, etc.) and/or the media stream.

Stitching service 208 may include one or more devices (e.g., computing devices, servers, databases, etc.) that generates a single sequence of video frames from the specialized content received from content server 112 and the media stream received from media CDN 108. For example, stitching service 208 may insert video frames corresponding to the specialized content into the video frames corresponding to the media stream or vice versa. Alternatively, stitching service may generate a new sequence of video frames from the video frames corresponding to the specialized content into the video frames corresponding to the media stream. Stitching service 208 may then transmit the single sequence of video frames to media receiver 120.

Media receiver 120 receives the single sequence of video frames and pass the video frames to video processor 128. Video processor 128 may process the single sequence of video frames (e.g., upscaling resolution, motion interpolation, etc.). Video processor 128 then passes the single sequence of video frames to video frame buffer 136 for display by display 140. Since the insertion of the media and/or specialized content into the media stream is performed by the stitching service, the media device 104, or, particularly, video processor 128 does not have to perform the insertion. Stitching service 208 reduces the processing resource of media device 204 consumed when displaying media streams by shifting the processing load to a remote device. Stitching service 208 may also reduce the likelihood that processing delays caused by video processor 128 may cause delays in presenting video frames by display 140. Stitching service 208 may perform the media and/or specialized content insertion for a set of media devices (e.g., including media device 204).

As similarly described in FIG. 1, client DCI controller 144 may determine that particular media and/or specialized content that is being displayed by display 140 is to be reported to tracking server 212. Client DCI controller 144 may transmit a communication to stitching service 208 indicating that the particular media and/or specialized content was displayed by media device 104 (as previously described). Stitching service 208 retransmits the communication to tracking server 208. Server-side media insertion system 200 uses stitching server 208 as a load balancer (e.g., by offloading media and/or specialized content insertion previously provided by video processor 128) and to manage the tracking of displayed media and/or specialized content by display 140.

Stitching service 208 may determine a cost for providing stitching services by determining the number of instances in which the media and/or specialized content was displayed by media devices. Tracking server 212 and/or stitching service 208 may report the number of instances in which the media and/or specialized content was displayed by media devices to content server 112 and/or media CDN 108. In some instances, stitching service 208 may not accurately track the number of instances in which the media and/or specialized content was displayed by media devices. Network errors may cause some communications to stitching service 208 or to tracking server 212 to be corrupted causing a false report or lost. Software errors (e.g., processor interrupts, unhandled exceptions, etc.) may prevent reported displays to be under or over counted and/or the aggregated quantity to become corrupted. Since stitching service is compensated based on the quantity of media and/or specialized content displayed, stitching service 208 may over-report the quantity of instances in which the media and/or specialized content was displayed. As a result, content server 112 and/or media CDN 108 may be charged a higher cost.

Figure 3:
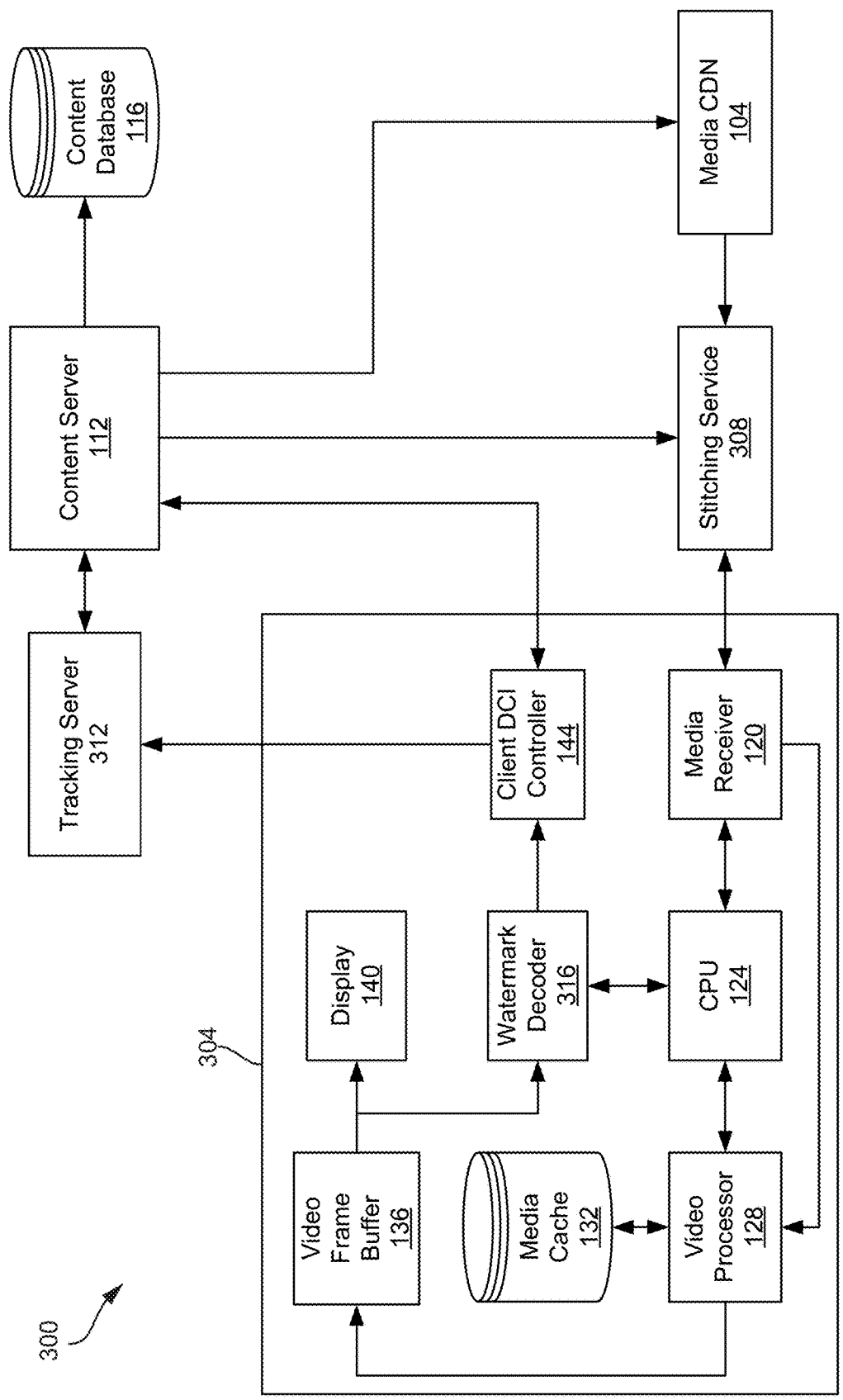
FIG. 3 illustrates an example block diagram of a secure stream system that securely monitors the display of content at a media device using watermarks according to aspects of the present disclosure.

Server-side media insertion system 200 may perform more efficiently by separating the stitching service 208 from the tracking the display of media and/or specialized content (as described in FIG. 3). By separating the stitching server from the tracking, the processing load of media devices can be reduced (e.g., as the media device may receive media streams that include the media and/or specialized content and the display of the media and/or specialized content can be more accurately tracked.

FIG. 3 illustrates an example block diagram of a secure stream system that securely monitors the display of content at a media device using watermarks according to aspects of the present disclosure. Secure stream system 300 separates the stitching service provided by stitching service 308 from media display tracking provided by tracking server 312. Media device 304 may include the same components as media device 104 of FIG. 1 (as shown), similar components as media device 104, or different components from media device 104. Media device 304 may requests a media stream for display by display 140 of media device 304. Media CDN 108 may receive the request and transmit the requested media stream to stitching service 308.

Media device 204 may also request specialized content for display during the media stream from content server 112. Media device 304 may include an identification of particular specialized content, an identification of a specialized content type, a general request for any specialized content, an identification of media device 304, an identification of information associated with media device 304 (e.g., network information, demographic information, user information, etc.), and/or the like. In some instances, media device 304 may request specialized content periodically (e.g., in regular or irregular intervals). For instance, media device 304 may request specialized content upon displaying a media stream. In another instance, media device 304 may request specialized content when media device 304 does not have specialized content available for display (e.g., in local storage such as media cache 132 or when specialized content is absent from the media stream received from stitching service 308). Content server 112 may obtain specialized content from content database 116 that satisfies the request and transmit the specialized content to media CDN.

Alternatively, stitching server 308 may request the specialized content for display during the media stream from content server 112. For example, stitching service 308 may determine when specialized content is to be inserted into a media stream received from media CDN 104. If stitching server 308 does not have specialized content stored locally, stitching server 308 may request the specialized content from content server 112. Content server 112 may transmit a response to stitching service 308 that identifies the specialized content and transmit a communication to media CDN that includes the specialized content (if media CDN 108 does not already include the identified specialized content). In some instances, the response may be a Video Ad Severing Template (VAST) response. The identified specialized content may be selected based on information associated with media device 304 (e.g., such as demographic information, hardware and/or software components of media device 304, network information of media device 304, etc.) and/or the media stream.

Content server 112 may transmit additional information to media CDN 108 that can be embedded into the specialized content. For example, content server may transmit a watermark or metadata to media CDN 108. A watermark may include a sequence of symbols encoded into one or more frames of the specialized content by modulating the pixel values of sets of pixels. The watermark may be positioned in a fringe of the video frame (e.g., such as the top n rows, bottom n rows, side n columns, combinations thereof, or the like). For example, the watermark may include shifting a luminance value and/or chrominance value of a first set of pixels to represent a first symbol (e.g., 1, or the like), and shifting the luminance value and/or chrominance value of a second set of pixels to represent a second symbol (e.g., 0, or the like). By shifting the shifting a luminance value and/or chrominance values the watermark may remain imperceptible to users when the video frame is displayed. Alternatively, content server 112 may embed the watermark into the specialized content before transmitting the specialized content to media CDN 108. The watermark may be embedded into one or more video frames of the specialized content. In some instances, the watermark may be embedded into each video frame of the specialized content.

The additional information may include an identification of the specialized content, a location (e.g., network address) of tracking server 312, a token (unique to media device 304 and/or the specialized content), encryption keys, information associated with the specialized content (e.g., quantity of video frames, estimated duration of specialized content when displayed, etc.), combinations thereof, or the like.

Stitching server 308 may generate the single sequence of video frames from the media stream and the specialized content and transmit the single sequence of video frames to media receiver 120. Media receiver 120 may pass the single sequence of video frames to video processor 128 for processing (if any is needed or requested). The single sequence of video frames may then be passed to video frame buffer 136 in preparation for display by display 140. When the single sequence of video frames is displayed, the watermark within the specialized content may be detected (e.g., by video processor 128 or by watermark decoder 316). Watermark decoder 316 may decode the watermark by extracting the sequence of symbols.

The sequence of symbols may then be decoded by media device 304 and used for further processing. For example, the sequence of symbols may identify the specialized content to enable client DCI controller 144 to report the display of the identified specialized content. The sequence of symbols may include an address of reporting server 312. Alternatively, client DCI controller 144 may request the address from control server 112 and/or another device.

The sequence of symbols may be secured to prevent unauthorized access to the watermark and unauthenticated reports of a display of the specialized content (e.g., by stitching service 308). The sequence of symbols may be secured by encrypting the sequence of symbols (e.g., using symmetric and/or asymmetric encryption). Alternatively, or additionally, the sequence of symbols may include a token that may be used to prevent an authenticate report of a display of the specialized content. When the watermark is generated by content server 112, content server may also generate the token. Content server 112 may store a matching token and/or transmit a matching token to tracking server 312. When watermark decoder 316 decodes the watermark and the sequence of symbols (and decrypts the decoded sequence of symbols if encrypted), watermark decoder 316 may identify the token and pass it to client DCI controller 144 with other information of the decoded from the watermark. Client DCI controller 144 may include the token when reporting the display of the specialized content.

The token may be unique to media device 304 and/or the specialized content and usable to authenticate a report of a display of the specialized content. By authenticating the report, secure stream system 300 may prevent devices from fraudulently reporting a display of specialized content and erroneously increasing the counter that indicates the quantity of instances that the specialized content was displayed. For example, in order to authenticate a report of a display of specialized content, the report would have to include the specified token. If the report does not include the token or includes the wrong token (e.g., that does not correspond to media device 304 and/or the specialized content), the report may not be authenticated, and the display of the specialized content included in the report may not be counted.

Tokens may be used for symmetrical and/or asymmetrical authentication. In symmetrical authentication, the matching token stored by content server 112 and/or tracking server 312 may be a copy of the token included in the watermark. In asymmetrical authentication, the matching token may be a complement of the token included in the watermark. The matching token may be different from the token, yet still be matched with the token. The matching token may be different from the token included in the watermark to prevent stitching server 308 or another device from extracting the token from the watermark and using the token to authenticate a fraudulent report of a display of the media and/or specialized content. The token and the matching token may have a one-to-one relationship such that a token may correspond to a single matching token and vice versa.

When tracking server 312 receives the communication from client DCI controller 144 with the token, tracking server 312 may match the received token with the corresponding token received from client server 112. If tracking server 312 identifies a matching token, then tracking server 312 may determine that the report of the display of the specialized content is authenticated and the display of the specialized content can be counted. If a corresponding token cannot be identified, tracking server 312 may transmit the token from media device 304 to content server 112 and content server 112 may attempt to identify a matching token. If content server 112 identifies a matching token, then content server 112 may transmit a communication to tracking server 312 with an indication that content server 112 identified a matching token. The communication may include the matching token for future use by tracking server 312.

If a corresponding token cannot be identified by content server 112, then content server 112 may transmit an indication that there are no matching tokens to tracking server 312. Tracking server 312 may then determine that the display of the specialized content is not authenticated and the display of the specialized content may not be counted. The report from client DCI controller 144 may then be purged from tracking server 312. Alternatively, or additionally, tracking server 312 may transmit a communication that the report was not authenticated to client DCI controller 144, content server 112, stitching server 308, client devices, and/or other devices.

Figure 4:
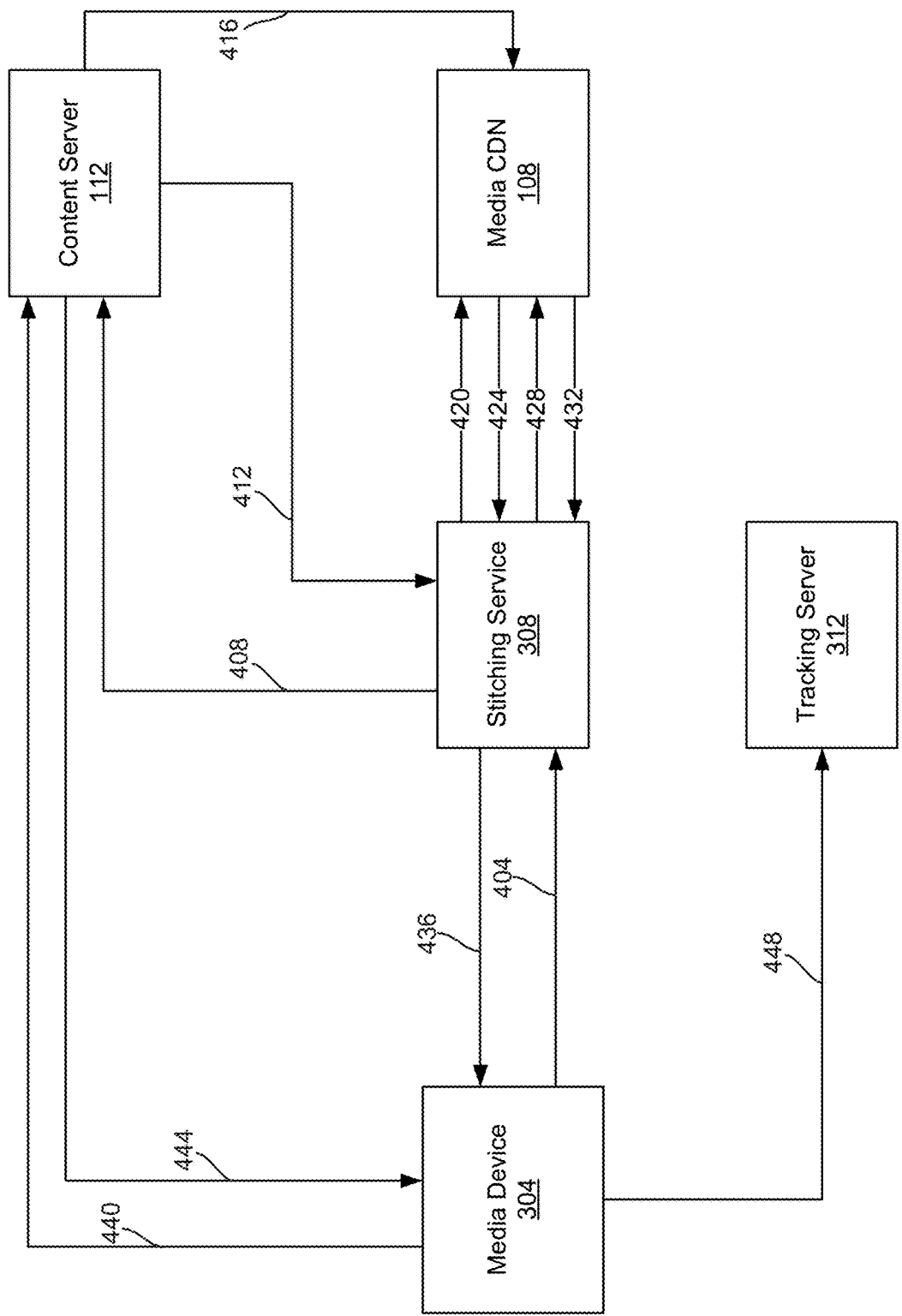
FIG. 4 illustrates an example block diagram of a process for monitoring the display of content at a media device using watermarks according to aspects of the present disclosure.

FIG. 4 illustrates an example block diagram of a process that monitors the display of content at a media device using watermarks according to aspects of the present disclosure. The system depicted in FIG. 4 may correspond to secure stream system 300 of FIG. 3. The process may begin when media device 304 transmits request 404 to stitching service 308 for a media stream (e.g., a sequence of video frames and/or audio, or the like). Stitching service 308 may transmit request 408 for additional media and/or specialized content to be inserted into the media stream requested by media device 304. Content server 112 transmits response 412 with an identification of the requested media and/or specialized content. In some instances, response 412 may be a VAST response.

Content server 112 may transmit communication 416 to media CDN 108 that includes a watermark for the requested media and/or specialized content. In some instances, content server 112 may apply the watermark to the media and/or specialized content and transmit the media and/or specialized content to media CDN 108. In other instances, content server 112 may communicate instructions for applying the watermark to media CDN 108 and media CDN 108 may apply the watermark to the media and/or specialized content. Response 412 and communication 416 may be transmitted in series (e.g., response 412 followed by communication 416 or vice versa) or in parallel.

Upon receiving response 412 from content server 112, stitching service 308 transmits request 420 that includes the identification of the media stream requested by media device 304 and request 428 that includes the identification of the media and/or specialized content. Request 420 and 428 may be transmitted in series (e.g., request 420 followed by request 428 or vice versa) or in parallel. Media CDN 108 identifies the requested media stream in a media CDN and transmits the requested media stream to stitching service 308 in response 424. Media CDN 108 identifies the requested media (in the media CDN) and/or specialized content (e.g., in a specialized content CDN) and transmits the requested media and/or specialized content (with the watermark) to stitching service 308 in response 432. Response 424 and 432 may be transmitted in series (e.g., response 424 followed by response 432 or vice versa) or in parallel.

Stitching service 308 may use the media stream and the media and/or specialized content received in responses 424 and 432 to generate a single sequence of video frames. Stitching service 308 transmits the single sequence of video frames via response 436 to media device 304. Media device 304 may process the sequence of video streams (e.g., image processing of individual frames, resolution upscaling or downscaling, frame extrapolation, etc.) in preparation for display. As media device 304 displays the video frames that comprise the watermark, media device 304 may detect and decode the watermark to derive the sequence of symbols. If the sequence of symbols is encrypted, media device 304 may decrypt the sequence of symbols to derive the information and/or instructions in included in the media device 304. The watermark may provide an identification of the media and/or specialized content that was watermarked, indicate that the display of the media and/or specialized content is to be communicated to tracking server 312, provide information associated with the media and/or specialized content (e.g., including, but not limited to, production staff, actors, facts regarding the production, facts regarding the context or semantics of the content of the media and/or specialized content, combination thereof, and/or the like), a token, combinations thereof, or the like.

If the watermark lacks an address to transmit an indication that the media and/or specialized content was displayed by media device 304 to tracking server 312, then media device 304 may transmit request 440 to content server 112 for an address to transmit the indication of the display of the media and/or specialized content. Content server may transmit response 444 that includes an identification of tracking server 312 and a destination address (e.g., such as a network address, URL, or the like) of tracking server 312. Response 444 may also include information to generate a communication to tracking server 312 such as a communication protocol, a data format, a time interval over which the indication is to be transmitted, and/or the like. Request 440 and response 444 (and/or other communications between media device 304 and content server 112) may be encrypted to prevent the destination address and/or other information communicated between media device 304 and content server 112 to be obtained by an unauthorized device.

Media device 304 receive response 444 and generates communication 448 to tracking server 312. Communication 448 may include an identification of the media and/or specialized content that was displayed, an indication that the media and/or specialized content was displayed by media device 304, an identification of media device 304, demographic information associated with media device 304 and/or users of media device 304, a duration over which the media and/or specialized content was displayed (e.g., in second, minutes, and/or as a percentage of time that the media and/or specialized content was displayed relative to a total time over which the media and/or specialized content was configured to be displayed), network information of media device 304 (e.g., IP address, MAC address, an identification of an ISP of media device 304, and/or the like), a token (e.g., to authenticate the communication as previously described in connection to FIG. 3), combinations thereof, or the like. Once the display of the media and/or specialized content is reported, the process may terminate and/or wait until media device 304 requests a new media stream, the sequence of video frames is entirely displayed, or the like. Communication 448 (and/or other communications between media device 304 and the device located at the destination address) may be encrypted to prevent the information communicated to the device located at the destination address from being obtained by an unauthorized device.

Figure 5:
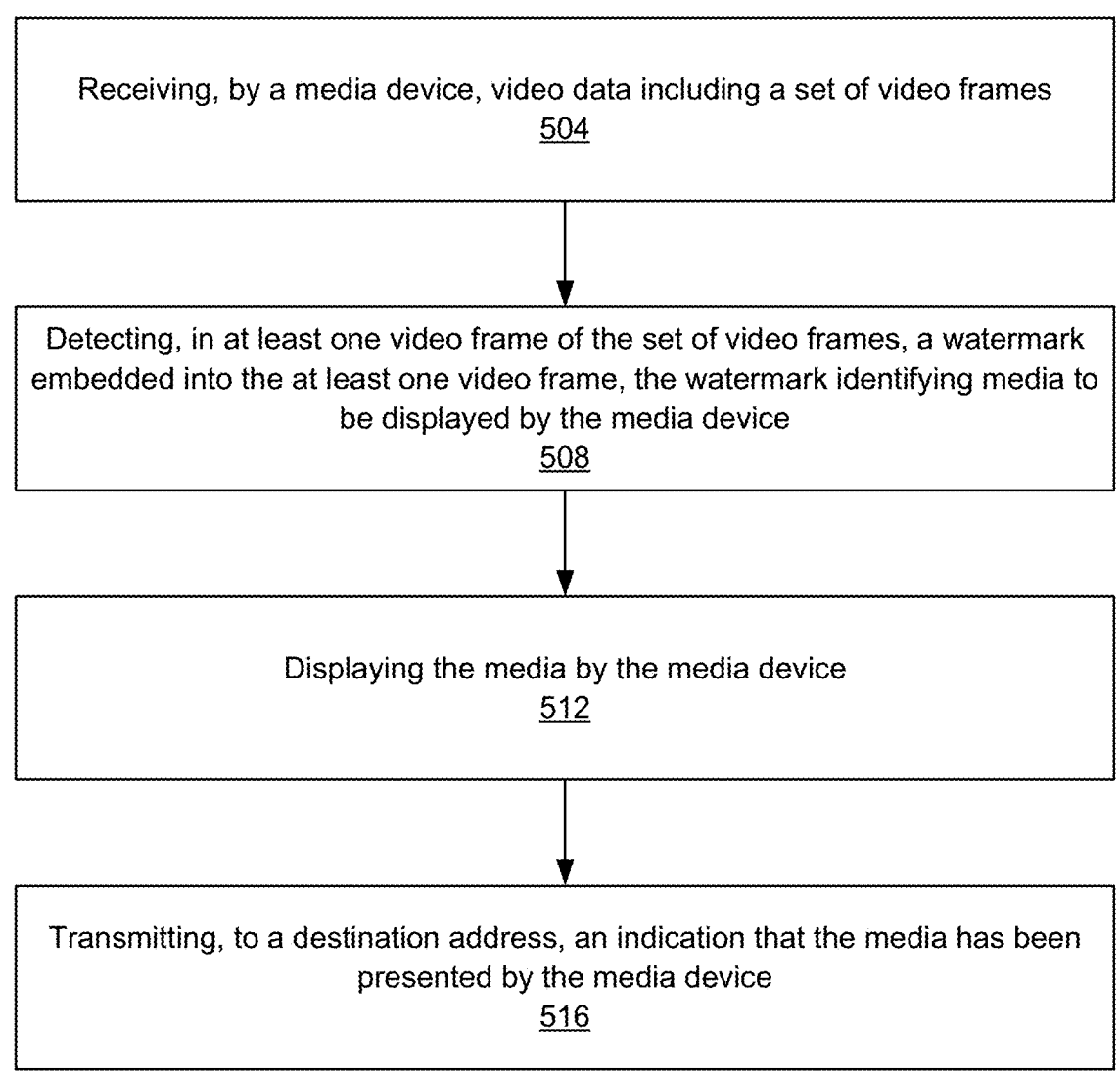
FIG. 5 illustrates a flowchart of an example process describing a media device monitoring and reporting the display of content according to aspects of the present disclosure.

FIG. 5 illustrates a flowchart of an example process 500 describing a media device monitoring and reporting the display of content according to aspects of the present disclosure. At block 504, a media device receives video data that includes a set of video frames (e.g., a sequence of video frames). The media device may receive the set of video frames from a stitching service (e.g., such as stitching service 304 of FIG. 3 and FIG. 4) that generates the set of frames from a requested media stream and specialized content. The set of video frames may be received in response to a request by the media device for a media stream or the media and/or specialized content.

At block 508, the media device detects a watermark within one or more frames of the set of frames. For example, the watermark may be embedded into one or more frames of the specialized content added to the media stream by the stitching service. The watermark may have been embedded into the one or more frames by a content server (e.g., content server 112) and/or a media CDN (e.g., media CDN 108).

The watermark may include a modulation of pixel values in a portion of the one or more frames to represent a sequence of symbols that can convey additional information and/or instructions associated with the specialized content. For example, the luminance and/or chrominance values of some pixels may be shifted to represent a first symbol and the luminance and/or chrominance values of other pixels may be shifted differently to represent a second symbol. In one example, the luminance value of a first set of pixels may be shifted to 55 to represent the first symbol and the luminance value of a second set of pixels may be shifted to 16 to represent the second symbol. In some instances, the sequence of symbols may be encrypted such that once the watermark is decoded into the sequence of symbols, the sequence of symbols may be decrypted.

The watermark may identify media to be displayed by the media device. For instance, the watermark may include a direct (e.g., an alphanumeric representation) or indirect (e.g., a code usable with a look up table) identification of the media and/or specialized content that is to be displayed (or is currently displayed) by the media device. In some instances, the watermark may identify media to be displayed by the media device by triggering the media device to obtain the identification from another source (e.g., such as local memory, content server, and/or the like).

At block 516, the media device displays video frames corresponding particular media associated with the watermark. In some instances, the video frames of the particular media may be the video frames of the media and/or specialized content. In other instances, the watermark may include instructions that identify the particular media and direct the media device to replace at least a portion of the video frames that correspond to the media and/or specialized content with the particular media. The media device may obtain the particular media from a media CDN (e.g., media CDN 108), from content server (e.g., content server 112), from local memory (e.g., media cache 132), from a client device, another remote device, and/or the like.

At block 520, the media device transmits a communication to a destination address (e.g., a network address, URL, or the like) that includes an indication that the particular media was displayed by the media device. The media device may obtain the destination address from the watermark or, if not present in the watermark, the media device may request the destination device from a remote server such as the content server.

The watermark may include a token that is to be included in the communication to the device located at the destination address (e.g., tracking server, or the like). The token may be used by the device to authenticate the communication. For example, if the token can be matched to a matching token, then the communication may be determined to be authentic, and the display of the particular media may be counted. If the token does not match a corresponding token, then the communication may be determined to not be authentic, and the display of the particular media may not be counted. Tokens may be used for symmetrical authentication (e.g., the token is identical to the matching token) or asymmetrical authentication (e.g., the token is different from but corresponds to the matching server in a one-to-one manner).

In some instances, communications between the media device and the remote server and/or communications between the media device and the device located at the destination address may be secured (e.g., encrypted using an asymmetrical or symmetrical encryption scheme) to prevent unauthorized access to the communications.

In some instances, process 500 may continue when the media device requests another media stream and/or receives a new set of video frames by returning to block 504. Alternatively, upon executing block 520, process 500 may terminate.

Figure 6:
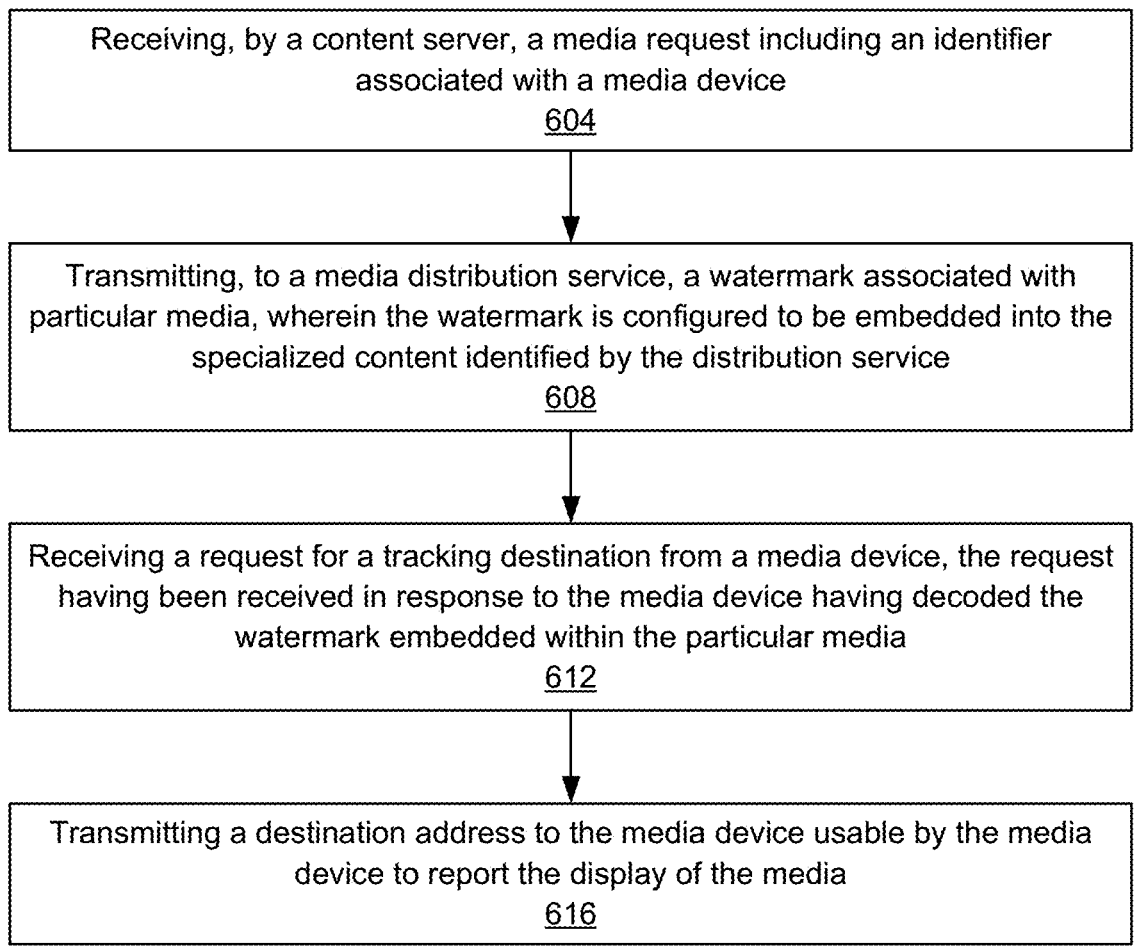
FIG. 6 illustrates a flowchart of an example process describing a media server involved in the monitoring and reporting of the display of content according to aspects of the present disclosure.

FIG. 6 illustrates a flowchart of an example process 600 describing a media server involved in the monitoring and reporting of the display of content according to aspects of the present disclosure. At block 604, a media server (e.g., such as content server 112, media CDN 108, or the like) receives a request for specialized content. The specialized content may include media (e.g., a television show, movie, trailer, or the like) and/or an advertisement (e.g., a commercial or the like), informational content (e.g., educational content or other informational content) or other content. The request may include an identification of a media device and/or an identification of a media stream that was requested by the media device. For example, the request may be received from the media device, from a stitching service, from a client device, and/or from another remote device.

In some cases, the media server can generate a response by identifying particular specialized content that is to be displayed by the media device within the media stream. The particular specialized content may be selected based on the identification of the media device, demographic information associated with the media device, the identification of the media stream requested by the media device, combinations thereof, or the like. In some examples, the media server may transmit the response to the device that requested the specialized content and/or the media CDN that will satisfy the request for the media stream.

At block 608, the media server transmits a watermark associated with particular specialized content. The watermark may include information and/or instructions that cause the media device to report the display of the specialized content to a tracking server such as, but not limited to, an identification of a device configured to track the display of the specialized content, a destination address, a token (e.g., to authenticate a reported display of the specialized content), a an identification of an expected duration of display of the specialized content, an identification of the specialized content, an indication that a display of the specialized content is to be reported, combinations thereof, or the like. The watermark may also include information associated with the media stream and/or specialized content such as production information (e.g., director, producer, production location, facts associated with the production, etc.), acting information (e.g., actors, etc.), contextual and/or semantic information (e.g., information associated with the content of the media and/or specialized content, etc.) combinations thereof, or the like. The contents of the watermark may be encrypted prior to being applied to a video frame or prior to being transmitted to a device that applies the watermark to a video frame.

In some instances, the media server applies the watermark to one or more frames of the specialized content (e.g., prior to transmitting the specialized content to a media CDN). In other instances, the media server transmits instructions to the media CDN storing the specialized content for applying the watermark to the specialized content. Applying the watermark to specialized content can include modifying, for each video frame that is to include the specialized content, pixels values of a first portion of pixels of the video frame to represent a first symbol and pixel values of a second portion of pixels of the video frame to represent a second symbol. For example, modifying the pixel values can include shifting a luminance value and/or chrominance value of the pixels.

Once the watermark is transmitted to the media CDN, the media CDN may transmit the media stream requested by the media device and the specialized content comprising the watermark to a stitching service. The stitching service generates a single sequence of video frames from two or more distinct video frame sources (e.g., the media stream and the specialized service, etc.) and transmits it to the media device for display.

When the media device displays the single sequence of video frames, the media device may detect and decode the watermark embedded in the one or more frames of the specialized content. Upon decoding the watermark, the media device may execute the instructions embedded with the watermark (or use the information of the watermark) to report the display of the specialized content.

At block 612, the media device may receive a request for a tracking destination from a media device. The request may be transmitted or received in response to the media device having decoded the watermark embedded within the particular media as previously described. In some instances, communications between the media server and the media device may be encrypted (e.g., using symmetric or asymmetric encryption schemes) to prevent the destination address and/or other information from being accessible to unauthorized devices.

At block 616, the media server transmits a destination address to the media device. The destination address (e.g., a network address, physical address, geolocation, URL, or the like) may correspond to a device (e.g., tracking server 312, or the like) configured to track a quantity of instances in which the specialized content has been displayed. The destination address may be usable by the media device to transmit a communication that indicates the specialized content was displayed by the media device. For example, the media device may transmit a communication to the device located at the destination address that includes an indication that the specialized content was displayed. The communication may also include an identification of the media and/or specialized content that was displayed, an indication that the media and/or specialized content was displayed by media device 304, an identification of media device 304, demographic information associated with media device 304 and/or users of media device 304, a duration over which the media and/or specialized content was displayed (e.g., in second, minutes, and/or as a percentage of time that the media and/or specialized content was displayed relative to a total time over which the media and/or specialized content was configured to be displayed), network information of media device 304 (e.g., IP address, MAC address, an identification of an ISP of media device 304, and/or the like), a token (e.g., to authenticate the communication as previously described in connection to FIG. 3), combinations thereof, or the like.

Figure 7:
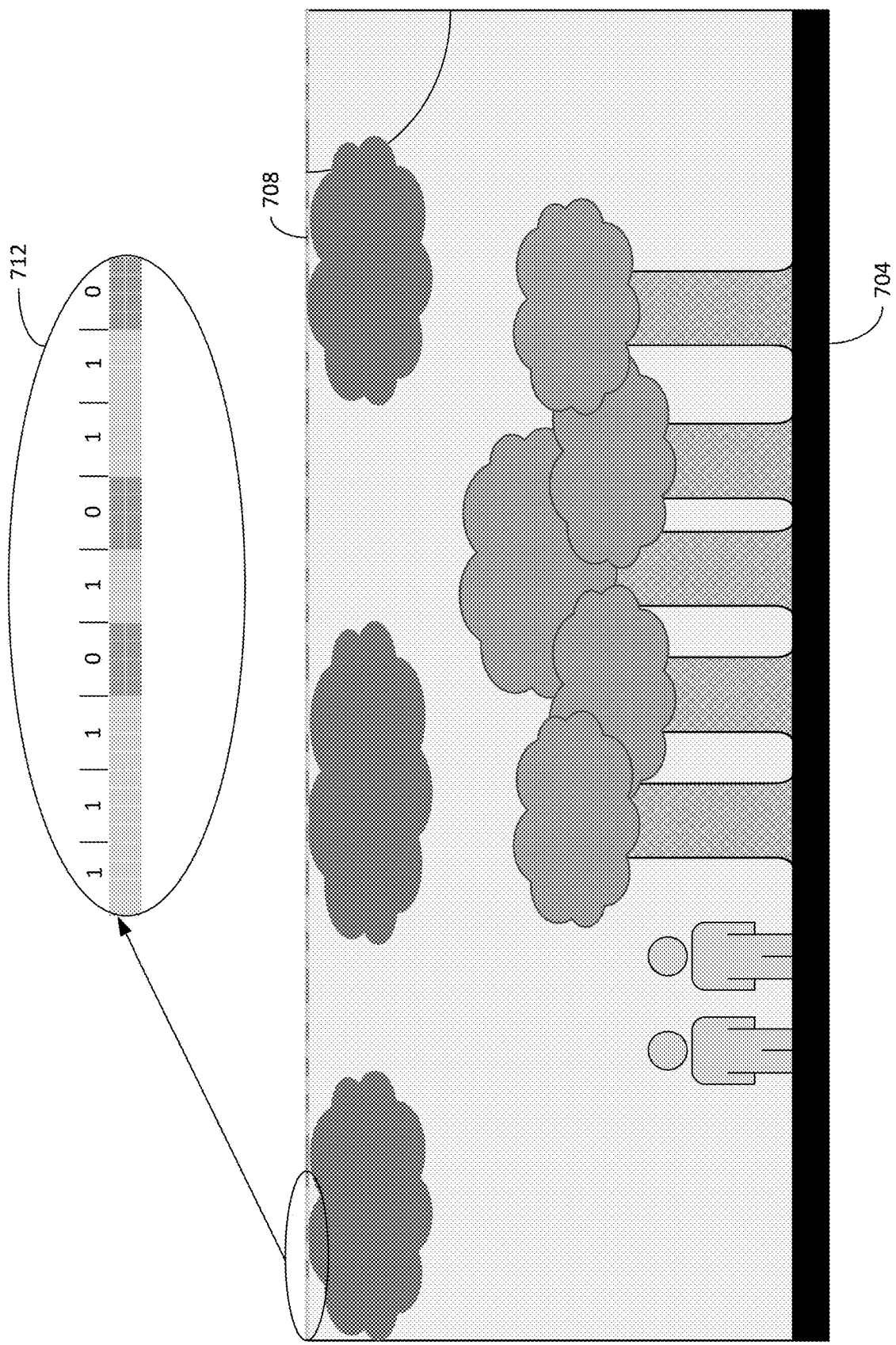
FIG. 7 illustrates an example of data embedded in the top rows of a video frame using a two-level watermark according to aspects of the present disclosure.

FIG. 7 illustrates an example of data embedded in the top rows of a video frame using a two-level watermark according to aspects of the present disclosure. Frame 704 represents a video frame that may be presented via media device. Watermark 708 may be inserted by modulating pixel values of a set of pixels of frame 704. The set of pixels may be positioned in a fringe of frame 704 such as the top one or more rows of pixels (as shown), the bottom one or more rows of pixels, right two columns of pixels, left two columns of pixels, etc. In some instances, watermark 708 may be split between two disparate locations of frame 708. For instance, watermark 708 may be located at both the top row and the bottom row, top row and left column, etc.

As shown, watermark 708 may include pixels of a first pixel value representing a first symbol of a binary code (e.g., 0) and pixels of a second pixel value representing a second symbol of the binary code (e.g., 1). Watermark 708 may include additional pixel values representing additional symbols of a non-binary code. Watermark 708 be represented by discrete sets of pixels that represent a symbol of the binary code. If the source is lossless (e.g., the signal data is not subject to distortion or loss due to noise or other signal impedances), then a single pixel may represent a single symbol. If the video source may be subject to loss (e.g., such as broadcast television, cable television, etc. where portions of the frame may be distorted due to noise, distance, etc.), then a set of pixels may represent a single symbol. As shown, eight pixels may be used represent each symbol (e.g., two rows of four pixels). In some instances, a particular video frame, such as a first video frame containing watermark 708, each set of pixels may include additional pixels (e.g., such as two rows of eight pixels, or the like), to ensure that the media device detects watermark 708.

The expanded portion 712 of watermark 708 illustrates the symbols represented in each set of pixels. In the example shown, sets of pixels having a higher luminance (e.g., closer to white) are assigned a value of 7 and sets of pixels having a lower luminance (e.g., closer to black) are assigned a value of zero. The luminance may be varied from between 0 (e.g., black) and 700 (e.g., white). In some instances, to reduce the perceptibility of the watermark, the difference in luminance between pixels representing 0 and pixels representing 1 may be minimized. For instance, the pixels representing 1 may have luminance of 50 and the pixels representing 0 may have a luminance of 10. The color component of the sets of pixels of the watermark 708 may be selected based on the color component of nearby pixels (e.g., adjacent portion of frame 704, or the like). The color component may be used for larger-base codes (e.g., codes with greater than 2 symbols) and/or to further reduce the perceptibility of watermark 708 by a user of the media device.

Figure 8:
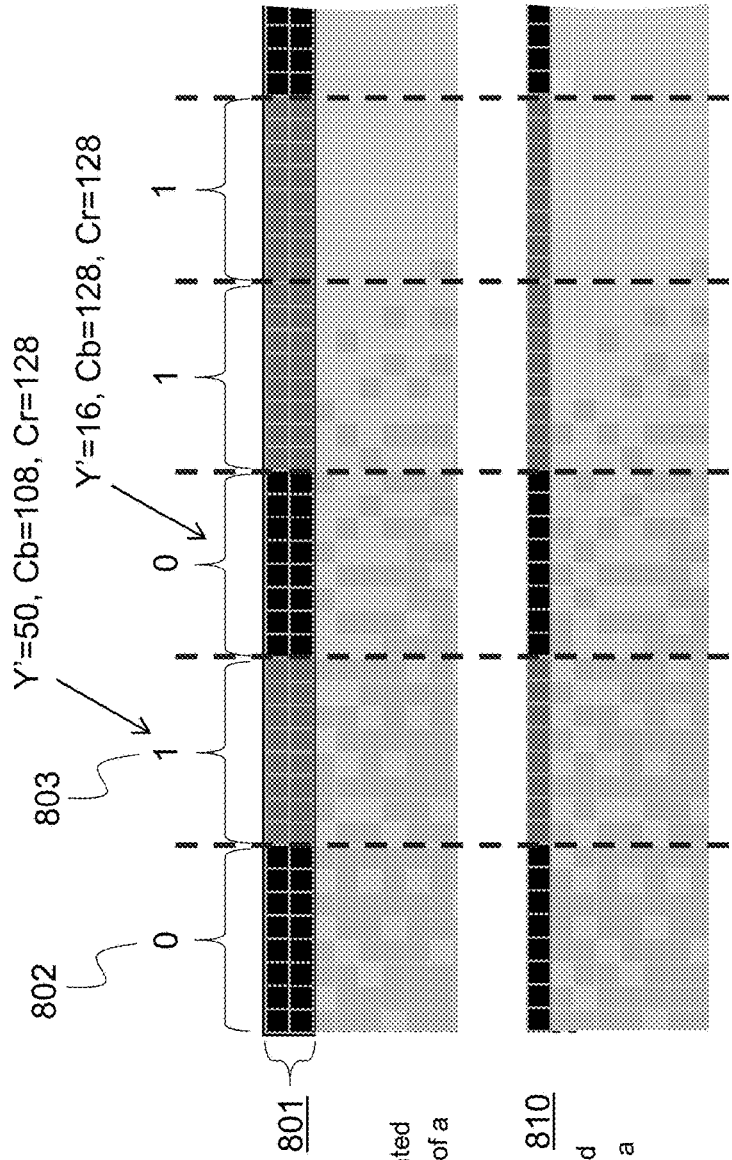
FIG. 8 illustrates example binary watermarks embedded into the top row and top two rows of a video frame according to aspects of the present disclosure.

FIG. 8 illustrates example binary-coded watermarks embedded into the top row and top two rows of a video frame according to aspects of the present disclosure. Watermark 801 illustrates a watermark comprising two rows of pixels representing a sequence of symbols. Each set of 16 pixels (2 rows of 8 pixels) represent a symbol of the watermark with darker pixels (e.g., having a luminance value Y' of 16) representing a symbol of 0 and lighter pixels (e.g., having a luminance value Y' of 50) representing a symbol of 1. The luminance value and/or chrominance component of the pixels may be selected based on the non-watermark portion of the frame to reduce a perceptibility of the watermark. As such, black and white (e.g., a luminance value Y' of 0 and 100 respectively) may not be selected.

The quantity of rows and/or pixels representing a single symbol of a watermark may be selected based on the signal quality of the video. For example, a high signal quality (e.g., little noise and/or loss, etc.) may use a single row. Watermark 810 illustrates a watermark comprising single row of pixels representing a same sequence of symbols as watermark 801. Alternatively, or additionally, a high signal quality may use less pixels per row to represent a single symbol (e.g., 4 pixels in a row, 2 pixels in a row, 1 pixel, or the like). Likewise, a poor-quality signal may use additional pixels per row or additional rows. Using additional pixels and/or rows per symbol may reduce the quantity of symbols that can be included in a single video frame but increases the likelihood that the watermark can be detected and decoded correctly. A media device may transmit an indication of a current signal quality to a remote server. The remote server may then modulate the watermark in each frame to increase the likelihood that the watermark may be detected and reduce the likelihood that the watermark noise or other artifacts affect the watermark.

Figure 9:
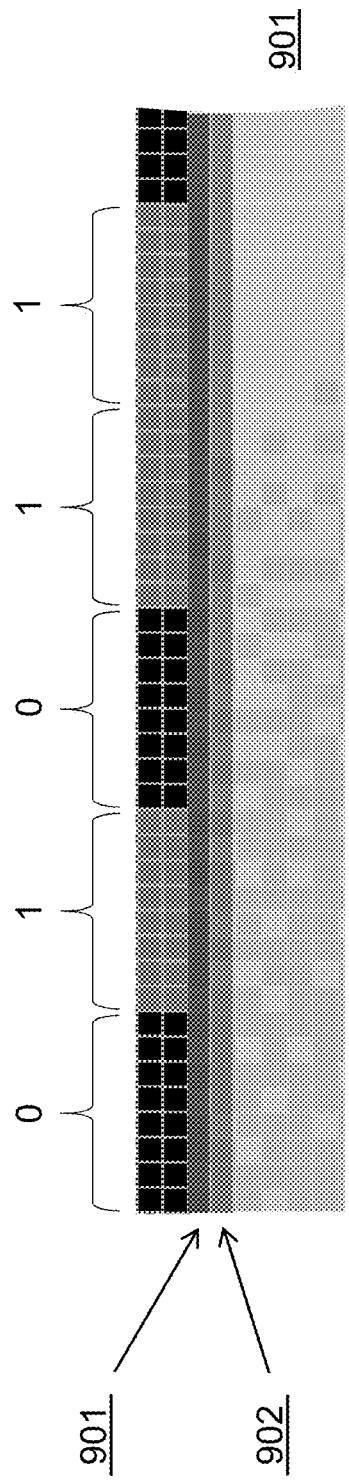
FIG. 9 illustrates an example video frame in which a transition region proximate to the watermark are darkened progressively to increase perceptual blurring of the watermark to the human eye according to aspects of the present disclosure

FIG. 9 illustrates an example video frame in which a transition region proximate to the watermark is darkened progressively to increase perceptual blurring of the watermark to the human eye according to aspects of the present disclosure. A boundary region may be generated between the watermark and the rest of the video frame. The boundary region may include one or more rows of pixels that are adjacent to the watermark. These rows be modified to cause a visual blending effect that reduces the perceptibility of the watermark. For instance, row 901 and 902 may be adjusted to a same value (e.g., proportional to the pixel values representing the symbols of the watermark). In some instances, each row may be independently adjusted to create a gradient. For instance, the luminance value, Y, of pixels of row 901 may be reduced based on the pixel values representing the symbols of the watermark and the luminance value, Y, of pixels of row 901 may also be reduced, but less than that of row 901.

The boundary region may include any number of rows. A luminance gradient may be defined that is equal to the average luminance of the video frame divided by the number of rows in the boundary region. Then it is determined whether the average luminance of the video frame is higher or lower than the average luminance of the watermark. If the average luminance of the video frame is higher than the average luminance of the watermark, then the boundary region may shift dark closest to the watermark to light closest to the video frame (e.g., a lower luminance to a higher luminance). If the average luminance of the video frame is lower than the watermark, then the boundary region may shift from light closest to the watermark to dark closest to the video frame (e.g., higher luminance to lower luminance).

For example, if the average luminance of the video frame is higher than the average luminance of the watermark, then luminance value of the pixels of the first row of the boundary region (e.g., the row adjacent to the watermark) may be reduced based on the average luminance of the video frame (e.g., a value proportional to the average luminance of the video frame, or the like). The luminance of the next row of the boundary region (the next row further from the watermark) may be reduced by the amount the previous row was reduced minus the luminance gradient. The luminance of each subsequent row further from the watermark may be reduced based on the amount the immediately previous row was reduced minus the luminance gradient.

For another example, if the average luminance of the video frame is lower than the average luminance of the watermark, then luminance value of the pixels of the first row of the boundary region (e.g., the row adjacent to the watermark) may be increased based on the average luminance of the video frame (e.g., a value proportional to the average luminance of the video frame, or the like). The luminance of the next row of the boundary region (the next row further from the watermark) may be increased by the amount the previous row was increased minus the luminance gradient. The luminance of each subsequent row further from the watermark may be increased based on the amount the immediately previous row was increased minus the luminance gradient.

Alternatively, if the average luminance of the video frame is lower than a first threshold, then the boundary region may have a gradient from light closest to the watermark to dark furthest from the watermark. If the average luminance of the video frame is higher than second threshold, then the boundary region may have a gradient from dark closest to the watermark to light furthest from the watermark. The difference in the luminance values of each row may be a proportional value of the average luminance value of the watermark or the video frame. It should be noted that the first threshold may be equal to or different from the second threshold.

FIG. 10A illustrates an example sequence of video frames in which the values for zero and one symbols of a watermark alternate to cause a perceptual blurring of the watermark to the human eye according to aspects of the present disclosure. Since watermarks include a modulation of the pixel values to indicate two or more types of symbols (depending on the base code), the alternating pixel values may appear as a flickering to a user of the media device. The flickering may be reduced or eliminated by presenting a reversed form of the video frame in a subsequent video frame. A first version of a watermark may be embedded into frame 1. A second version of the same watermark may be embedded into frame 2. The second version of the watermark may be an inverted form of the first watermark. For example, each set of pixels having a luminance value representing the first symbol (e.g., a low luminance between 10-16) may be given the luminance value representing the second symbol (e.g., a high luminance between 45-55). Each set of pixels having a luminance value representing the second symbol may be given the luminance value representing the first symbol.

The media device, after receiving the first version of the watermark in frame 1 may expect the watermark in frame 2 to be inverted. When decoding the watermark in frame 2, the media device may invert the decoded symbols (e.g., each first symbol may be replaced with the second symbol, and each second symbol may be replaced with the first symbol). The media device may receive an indication of how many frames are to include a same watermark (e.g., in alternating inverted form) to ensure the watermark is detected and decoded correctly.

In some instances, the next frame (e.g., frame 3) may include an inverted watermark of the watermark included in the previous frame (e.g., frame 2), which is equal to the original watermark (e.g., in frame 1). The watermark may be inverted one or more times using two or more video frames. By inverting the pixels in alternating frames, the user may perceive the watermark as the average pixel values between the two frames. For example, if a first pixel is white and the inverted pixel is black, when displayed in quick succession, the two pixels will look gray (as shown). This may cause the watermark to appear as a solid color rather than flickering pixels. Increasing the number of times that the watermark is inverted, may decreases the likelihood that the watermark can be perceived but may reduce the quantity of data that can be transmitted with a given set of video frames. A quantity of frames over which the watermark is to be inverted, based on the quantity of data that is to be embedded into the watermark and the likelihood that the watermark may be detected.

Figure 10B:
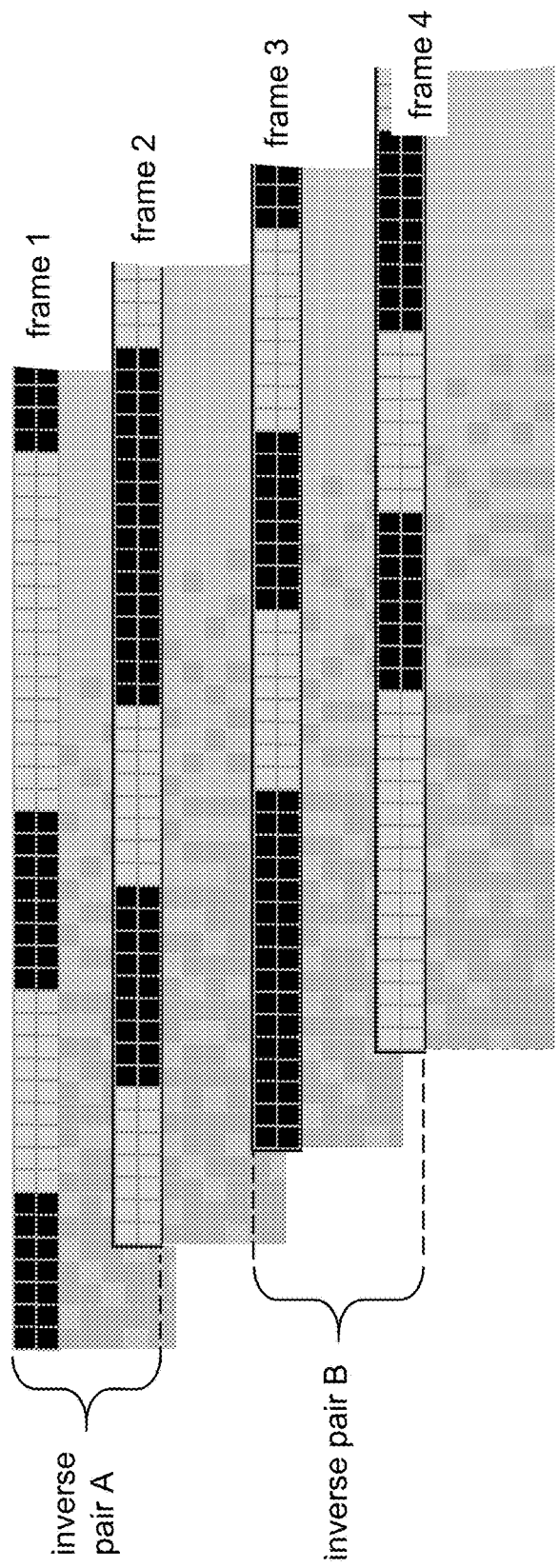
FIG. 10B illustrates an example video inversion of the data symbols every two frames to improve perceptual blending of the data symbols according to aspects of the present disclosure.

FIG. 10B illustrates an example video inversion of the data symbols every two frames to improve perceptual blending of the data symbols according to aspects of the present disclosure. In some instances, a sequence of watermarks may be inserted into a set of frames to transmit larger quantities of data to the media device. For example, frame 1 may include a first watermark and frame 2 may include an inverted form of the first watermark. Frame 1 and frame 2 may be referred to as inverse pair A. The next watermark in the sequence of watermarks may be embedded into frame 3 with the inverse of that watermark being embedded into frame 4 (e.g., inverse pair B). Each odd video frame may include a new watermark in the sequence of watermarks and each even frame may include an inverted form of the watermark that was embedded in the immediately previous video frame.

When a sequence of watermarks is embedded into a set of video frames, it may be more perceptible to a user. The modulation of the pixels between video frames and watermarks may appear as flicker. By embedding a watermark and the inverted form of that watermark in successive video frames that flicker may be reduced or eliminated.

Figure 11:
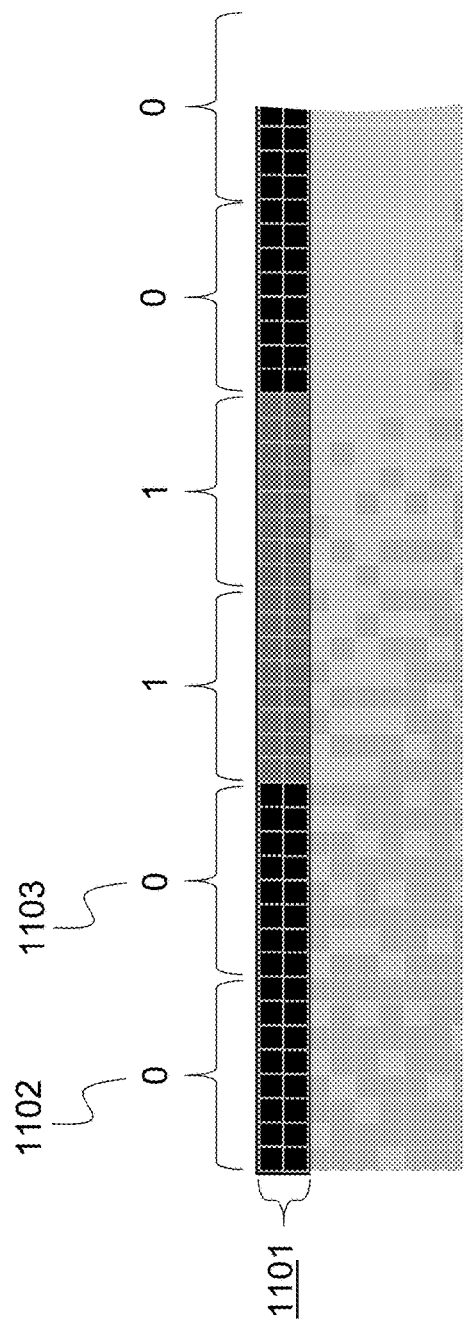
FIG. 11 illustrates an example watermark with a strengthened lead-in data symbol sequence to strengthen the detection of a watermarked frame according to aspects of the present disclosure.

FIG. 11 illustrates an example watermark with a strengthened lead-in data symbol sequence to strengthen the detection of a watermarked frame according to aspects of the present disclosure. Watermarks may include sets of pixels that each represent a symbol of a binary code. The quantity of pixels in the set of pixel representing a symbol may be referred to as the pixel size of the symbol. In some instances, the pixel size may be 4 pixels (if the watermark is 1 row) or 8 pixels (if the watermark is 2 rows, such as 2 rows of 4 pixels). The pixel values of the set of pixels may correspond to approximately a same pixel value. Alternatively, the pixel values of the set of pixels may correspond to similar pixel values (e.g., within a range).

A watermark may begin with a predetermined pattern of data that signals the start of the watermark (known as a lead-in pattern). The predetermined pattern may be positioned in the first 8 or 16 symbols of the watermark. The media device may first determine if the predetermined pattern is detected in the first x pixels of the video frame (e.g., the quantity of pixels per symbol*the number of symbols in the predetermined pattern of data). If the predetermined pattern is detected, the media device may continue decode the remaining pixels in that row.

The lead-in pattern in watermarks may be adjusted to increase the likelihood that the watermark will be detected by the media device. For example, the pixel size of each symbol may be increased. By increasing the pixel size of each symbol, the lead-in pattern may be more reliably decoded by media devices. In some examples, the pixel size of each symbol of the lead-in pattern may be doubled (e.g., as shown). The pixel size of the rest of the symbols of the watermark may not be adjusted. For instance, if the lead-in pattern is 8 symbols with a pixel size of 4, then only lead-in pattern may take up the first 64 pixels (e.g., pixel size of 8 per symbol with 8 symbols) and the pixel size of the symbols after the lead-in pattern may remain at 4. The lead-in pattern may be especially useful when watermarked frames occur periodically among a large quantity of video frames that do not include watermarks.

In the example, watermark 1101 includes a lead-in pattern with increased pixel size per symbol. The symbols of the lead-in pattern a represented by double the pixel size (e.g., 2 rows of 4 to 2 rows of 8). For example, symbol 1102 and 1103 are represented by 16 pixels instead of 8. The increased pixel size per symbol continues for the length of the lead-in pattern (e.g., 8-16 symbols or up to 256 pixels). At the end of the lead-in pattern and for the remainder of the watermark in that video frame, the pixel size if each symbol is not increased (e.g., 2 rows of 8). The lead-in pattern may include a pixel size per symbol that is increased by any amount such as, but not limited to, double the regular pixel size per symbol, triple the regular pixel size per symbol, a fraction of the regular pixel size per symbol, a multiple of the regular pixel size per symbol, or the like).

Figure 12:
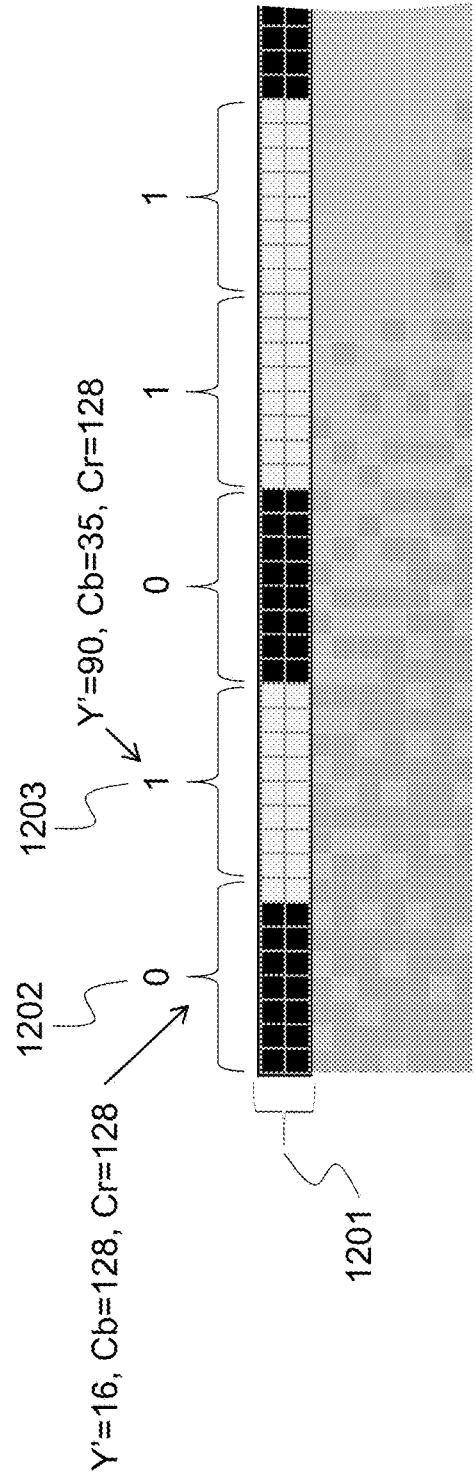
FIG. 12 illustrates an example of data symbols of a watermark in which the Euclidean distance between the zero and one symbols is temporarily increased according to aspects of the present disclosure.

FIG. 12 illustrates an example of data symbols of a watermark in which the Euclidean distance between the zero and one symbols is temporarily increased according to aspects of the present disclosure. Watermarks may be encoded into a video frame by modulating the pixel value of a set of pixels such as the pixels in the top two rows of the video frame. Modulating the pixel values may be include selecting two luminance values to represent two symbols of a binary code. The two luminance values may be selected based on a likelihood that the media device may detect each symbol in the presence of noise or the like and a likelihood that the watermark will not be perceived by a user of the media device. If the luminance values for the first symbol and the second symbol are too close together signal noise may prevent the media device from accurately determining if a set of pixels represents a first symbol or a second symbol. The closer the luminance values for the first symbol and the second symbol are the less likely a user will perceive the watermark. The luminance values may be selected as the smallest difference that provides a threshold likelihood that the media device will be able to detect and accurately decode the symbol sequence of the watermark. In some instances, the difference may be approximately 40 such that pixels representing the first symbol may have a luminance value of approximately 5-15 and pixels representing the second symbol may have a luminance value of approximately 45-55.

Signal noise may induce errors in the decoded symbol sequence when the luminance difference between symbols is minimal (e.g., the approximately 40). To reduce the likelihood of errors in the decoded symbol sequence, an error correction watermark may be inserted into one or more video frames of a set of video frames that are to include the watermark. The error correction watermark may include a higher difference between the luminance values representing the first symbol and the luminance values representing the second symbol. In some instances, the difference between the high luminance value and the low luminance value for the error correction watermark may be approximately 80 such that pixels representing the first symbol may have a luminance value of approximately 10-20 and pixels representing the second symbol may have a luminance value of approximately 75-85.

For example, watermark 1201 of FIG. 12 may be an error correction watermark that includes symbol 1202 having a luminance value of 16 and symbol 1203 having a luminance value of 90. The difference in luminance values of the watermark is 74. The luminance values of symbols 802 and 803 of FIG. 8 is 16 and 50 respectively. The difference in the luminance values between symbols 802 and 803 is 36. The difference in luminance values between symbols of the watermark of FIG. 12 is twice the difference in luminance values between symbols of the watermark of FIG. 8, which reduces a likelihood of errors in the in the decoded symbol sequence.

When the media device receives the error correction watermark, the larger difference in luminance values between symbols increases a likelihood that the media device may detect and decode the symbol sequence correctly. The next video frame may include the regular watermark with the regular (smaller) difference in luminance values between symbols.

The error correction watermark may be embedded into multiple frames of the set of frames. For example, the error correction watermark may be inserted every 'n' frames. Alternatively, or additionally, the error correction watermark may be inserted in one or more adjacent video frames each time the error correction watermark is inserted. For instance, each time the error correction watermark is inserted into a video frame, the error correction watermark may also be inserted into one or more subsequent frames (e.g., for m−1 frames). That is, each time the error correction watermark is inserted, it may be inserted into 'm' video frames.

Alternatively, or additionally, when an average luminance of the video frame is high (e.g., greater than a first threshold), the pixels of the watermark may be modulated such that the difference in luminance values between pixels representing the first symbol and pixels representing the second symbol is approximately 80 (e.g., using luminance values of approximately 10-20 to represent the first symbol and luminance values of approximately 70-80 to represent the second symbol, or any luminance values where the difference between them is approximately 80). When an average luminance of the video frame is low (e.g., less than a second threshold), the pixels of the watermark may be modulated such that the difference in luminance values between pixels representing the first symbol and pixels representing the second symbol is approximately 40 (e.g., using luminance values of approximately 10-20 to represent the first symbol and luminance values of approximately 45-55 to represent the second symbol, or any luminance values where the difference between them is approximately 40). Additionally, when the average luminance of the video frame is low, the pixels of the watermark may have a color channel, such as Cr, adjusted between extreme values for the zero and one symbol colors. The first threshold and the second threshold may be predetermined or dynamically determined based on pixel values of the video frame. In some instances, the first threshold may be equal to the second threshold. In other instances, the first threshold may be difference from the second threshold.

An alternative error correction process may include embedding a same watermark into multiple adjacent video frames or multiple instances of the same video frame (each including the same watermark). By transmitting a same watermark more than once, the media device may be better able to recover data that may be distorted by the video distribution path (e.g., from the source to the media device). If the lead-in pattern is detected but the remainder of the video does not decode reliably, the averaging of video values of the subsequent video frames of the group can increase the signal-to-noise ratio to provide decodable data. In some instances, the media device may average the pixel values of each instance of the same watermark before decoding watermark into the symbols The media device can identify related video frames (whether two or more in the group) by a unique lead-in pattern in the first watermark of a group of video frames that are to include a same watermark. The unique lead-in pattern may indicate the quantity of frames included in the video frame based on the unique lead-in pattern being associated with a known quantity of video frames or based on the symbols of the unique lead-in pattern indicating how many of the next video frames will include the same watermark. Alternatively, first lead-in pattern may be used to indicate the start of a group of video frames and a second lead-in pattern may be used to indicate the last frame in the group of video frames. The alternative error correction process may be combined with other processes as described herein including the error correction watermark as previously described.

Figure 13:
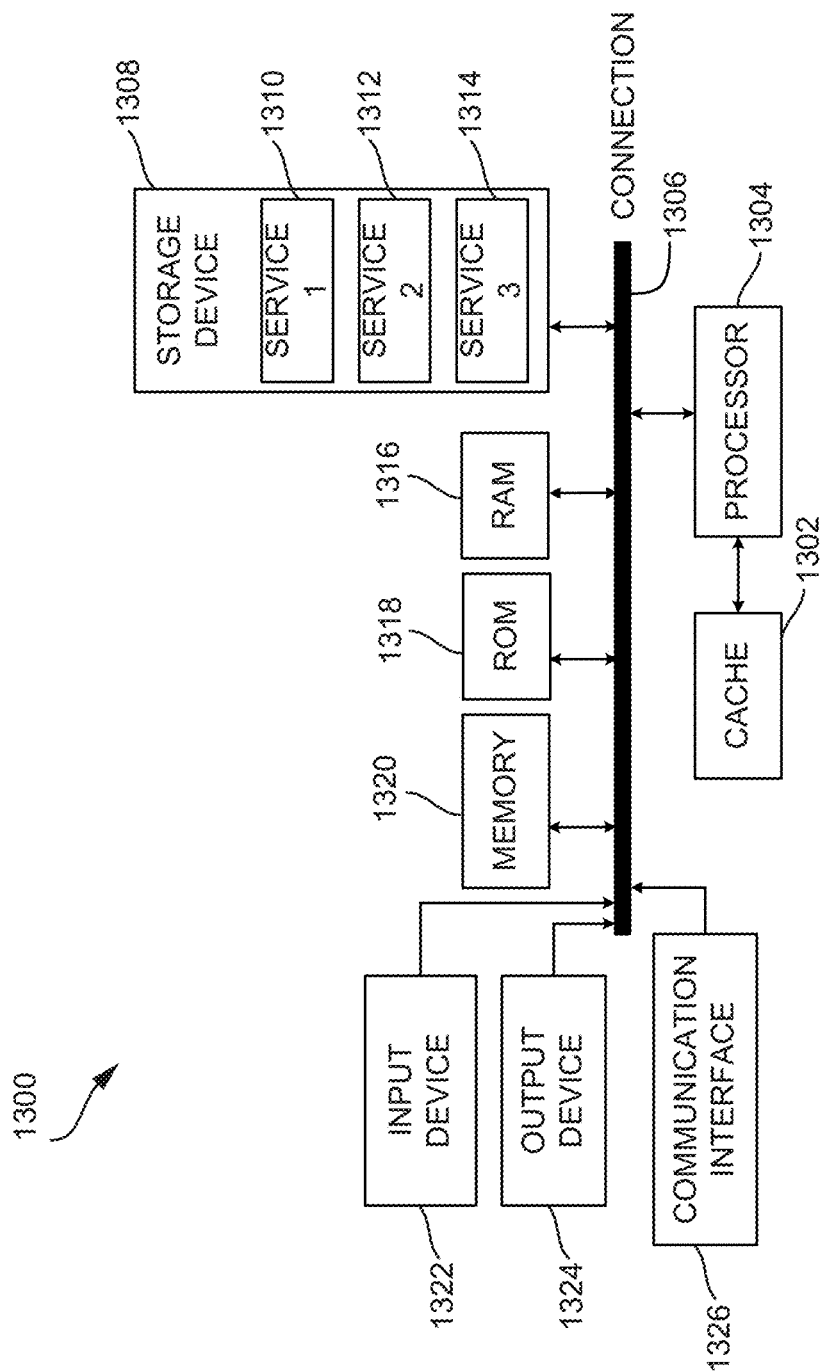
FIG. 13 illustrates an example computing device architecture of an example computing device that can implement the various techniques described herein according to aspects of the present disclosure.

FIG. 13 illustrates an example computing device according to aspects of the present disclosure. For example, the computing device 1300 can implement any of the systems or methods described herein. In some instances, the computing device 1300 may be a component of or included within a media device. The components of computing device 1300 are shown in electrical communication with each other using connection 1306, such as a bus. The example computing device architecture 1300 includes a processor (e.g., CPU, processor, or the like) 1304 and connection 1306 (e.g., such as a bus, or the like) that is configured to couple components of computing device 1300 such as, but not limited to, memory 1320, read only memory (ROM) 1318, random access memory (RAM) 1316, and/or storage device 1308, to processing unit 1310.

Computing device 1300 can include a cache 1302 of high-speed memory connected directly with, in close proximity to, or integrated within processor 1304. Computing device 1300 can copy data from memory 1320 and/or storage device 1308 to cache 1302 for quicker access by processor 1304. In this way, cache 1302 may provide a performance boost that avoids delays while processor 1304 waits for data. Alternatively, processor 1304 may access data directly from memory 1320, ROM 817, RAM 1316, and/or storage device 1308. Memory 1320 can include multiple types of homogenous or heterogeneous memory (e.g., such as, but not limited to, magnetic, optical, solid-state, etc.).

Storage device 1308 may include one or more non-transitory computer-readable media such as volatile and/or non-volatile memories. A non-transitory computer-readable medium can store instructions and/or data accessible by computing device 1300. Non-transitory computer-readable media can include, but is not limited to magnetic cassettes, hard-disk drives (HDD), flash memory, solid state memory devices, digital versatile disks, cartridges, compact discs, random access memories (RAMs) 1325, read only memory (ROM) 1320, combinations thereof, or the like.

Storage device 1308, may store one or more services, such as service 1 1310, service 2 1312, and service 3 1314, that are executable by processor 1304 and/or other electronic hardware. The one or more services include instructions executable by processor 1304 to: perform operations such as any of the techniques, steps, processes, blocks, and/or operations described herein; control the operations of a device in communication with computing device 1300; control the operations of processing unit 1310 and/or any special-purpose processors; combinations therefor; or the like. Processor 1304 may be a system on a chip (SOC) that includes one or more cores or processors, a bus, memories, clock, memory controller, cache, other processor components, and/or the like. A multi-core processor may be symmetric or asymmetric.

Computing device 1300 may include one or more input devices 1322 that may represent any number of input mechanisms, such as a microphone, a touch-sensitive screen for graphical input, keyboard, mouse, motion input, speech, media devices, sensors, combinations thereof, or the like. Computing device 1300 may include one or more output devices 1324 that output data to a user. Such output devices 1324 may include, but are not limited to, a media device, projector, television, speakers, combinations thereof, or the like. In some instances, multimodal computing devices can enable a user to provide multiple types of input to communicate with computing device 1300. Communications interface 1326 may be configured to manage user input and computing device output. Communications interface 1326 may also be configured to managing communications with remote devices (e.g., establishing connection, receiving/transmitting communications, etc.) over one or more communication protocols and/or over one or more communication media (e.g., wired, wireless, etc.).

Computing device 1300 is not limited to the components as shown if FIG. 13. Computing device 1300 may include other components not shown and/or components shown may be omitted.

Illustrative aspects of the disclosure include but are not limited to:

Aspect 1: A method comprising: receiving, by a media device, video data including a set of video frames; detecting, in at least one video frame of the set of video frames, a watermark embedded into the at least one video frame, wherein the watermark identifies media to be displayed by the media device; displaying the media by the media device; and transmitting, to a destination address based on detecting the watermark, an indication that the media has been presented by the media device.

Aspect 2: The method of Aspect 1, further comprising: transmitting, in response to detecting the watermark identifying the media to be displayed by the media device, a request for a destination address; and receiving the destination address.

Aspect 3: The method of any of Aspects 1 to 2, wherein the video data includes a token associated with the media, and wherein transmitting the indication that the media has been presented by the media device includes transmitting the token.

Aspect 4: The method of any of Aspects 1 to 3, wherein the media is stored in local memory of the media device before the video data is received.

Aspect 5: The method of any of Aspects 1 to 4, wherein the media is displayed in place of one or more frames of the set of frames.

Aspect 6: The method of any of Aspects 1 to 5, wherein the video data is received from a device associated with an address different than the destination address.

Aspect 7: The method of any of Aspects 1 to 6, wherein the watermark includes a sequence of symbols.

Aspect 8: The method of any of Aspect 1 to 7, wherein sequence of symbols includes an identification of the destination address.

Aspect 9: The method of any of Aspects 1 to 8, further comprising: encrypting the indication that the media has been presented by the media device prior to the transmitting.

Aspect 10: A system comprising one or more processors and a non-transitory computer-readable storage medium that stores instructions that, when executed by the one or more processors, cause the one or more processors to perform operations according to any of Aspects 1-9.

Aspect 11: A non-transitory computer-readable storage medium that stores instructions that, when executed by one or more processors, cause the one or more processors to perform operations according to any of Aspects 1-9.

Aspect 12: An apparatus comprising one or more means for performing operations according to any of Aspects 1-9.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Illustrative aspects of the disclosure include:

Aspect 1: A method comprising: receiving, by a media device, video data including a set of video frames; detecting, in at least one video frame of the set of video frames, a watermark embedded into the at least one video frame, wherein the watermark is usable to identify media to be displayed by the media device; displaying, by the media device, the media; and transmitting an indication that the media has been presented by the media device to a destination address in response to detecting the watermark.

Aspect 2: The method of Aspect 1, further comprising: transmitting, in response to detecting the watermark, a request for the destination address associated with the media; and receiving the destination address.

Aspect 3: The method of any of Aspects 1-2, wherein the video data includes a token associated with the media, and wherein transmitting the indication that the media has been presented by the media device includes transmitting the token.

Aspect 4: The method of any of Aspects 1-3, wherein the media is stored in local memory of the media device before the video data is received.

Aspect 5: The method of any of Aspects 1-4, wherein the media replaces one or more frames of the set of frames.

Aspect 6: The method of any of Aspects 1-5, wherein the video data is received from a device associated with an address that is different than the destination address.

Aspect 7: The method of any of Aspects 1-6, wherein the watermark includes a sequence of symbols.

Aspect 8: A non-transitory computer-readable storage medium that stores instructions that, when executed by one or more processors, cause the one or more processors to perform operations according to any of Aspects 1-7.

Aspect 9: An apparatus comprising one or more means for performing operations according to any of Aspects 1-7.

The invention claimed is:

1. A method comprising:
   receiving, by a media device, a media segment configured for presentation by the media device, wherein the media segment includes a set of video frames;
   detecting, in at least one video frame of the set of video frames, a watermark based on pixel values of pixels of a set of pixels of the at least one video frame;
   extracting watermark data from the set of pixels by defining a sequence of symbols from the set of pixels, wherein pixels of the set of pixels having a first pixel value are assigned a first symbol and pixels of the set of pixels having a second pixel value are assigned a second symbol, wherein the watermark data is usable to identify a replacement media segment to be displayed by the media device, and wherein the watermark data includes a token associated with the replacement media segment;
   displaying, by the media device, the replacement media segment in place of the media segment; and
   transmitting the token to a destination address, wherein the token is configured to provide proof that the replacement media segment has been presented by the media device.

2. The method of claim 1, further comprising:
   transmitting, in response to detecting the watermark, a request for the destination address associated with the replacement media segment; and
   receiving the destination address.

3. The method of claim 1, wherein the replacement media segment is stored in local memory of the media device before the media segment is received.

4. The method of claim 1, wherein the replacement media segment replaces one or more frames of the set of video frames.

5. The method of claim 1, wherein the media segment is received from a device associated with an address that is different than the destination address.

6. A system comprising:
   one or more processors; and
   a non-transitory computer-readable storage medium that stores instructions that, when executed by the one or more processors, cause the one or more processors to perform operations including:
   receiving, by a media device, a media segment configured for presentation by the media device, wherein the media segment includes a set of video frames;
   detecting, in at least one video frame of the set of video frames, a watermark based on pixel values of pixels of a set of pixels of the at least one video frame;
   extracting watermark data from the set of pixels by defining a sequence of symbols from the set of pixels, wherein pixels of the set of pixels having a first pixel value are assigned a first symbol and pixels of the set of pixels having a second pixel value are assigned a second symbol, wherein the watermark data is usable to identify a replacement media segment to be displayed by the media device, and wherein the watermark data includes a token associated with the replacement media segment;
   displaying, by the media device, the replacement media segment in place of the media segment; and
   transmitting the token to a destination address, wherein the token is configured to provide proof that the replacement media segment has been presented by the media device.

7. The system of claim 6, wherein the operations further include:
   transmitting, in response to detecting the watermark, a request for the destination address associated with the replacement media segment; and
   receiving the destination address.

8. The system of claim 6, wherein the replacement media segment is stored in local memory of the media device before the media segment is received.

9. The system of claim 6, wherein the replacement media segment replaces one or more frames of the set of video frames.

10. The system of claim 6, wherein the media segment is received from a device associated with an address that is different than the destination address.

11. A non-transitory computer-readable storage medium that stores instructions that, when executed by one or more processors, cause the one or more processors to perform operations including:

receiving, by a media device, a media segment configured for presentation by the media device, wherein the media segment includes a set of video frames;

detecting, in at least one video frame of the set of video frames, a watermark based on pixel values of pixels of a set of pixels of the at least one video frame;

extracting watermark data from the set of pixels by defining a sequence of symbols from the set of pixels, wherein pixels of the set of pixels having a first pixel value are assigned a first symbol and pixels of the set of pixels having a second pixel value are assigned a second symbol, wherein the watermark data is usable to identify a replacement media segment to be displayed by the media device, and wherein the watermark data includes a token associated with the replacement media segment;

displaying, by the media device, the replacement media segment in place of the media segment; and transmitting the token to a destination address, wherein the token is configured to provide proof that the replacement media segment has been presented by the media device.

12. The non-transitory computer-readable storage medium of claim 11, wherein the operations further include:

transmitting, in response to detecting the watermark, a request for a destination address associated with the replacement media segment; and receiving the destination address.

13. The non-transitory computer-readable storage medium of claim 11, wherein the replacement media segment is stored in local memory of the media device before the media segment is received.

14. The non-transitory computer-readable storage medium of claim 11, wherein the replacement media segment replaces one or more frames of the set of video frames.

15. The non-transitory computer-readable storage medium of claim 11, wherein the media segment is received from a device associated with an address that is different than the destination address.

* * * * *